(12) United States Patent
Mechernich et al.

(10) Patent No.: US 10,294,396 B2
(45) Date of Patent: May 21, 2019

(54) POST-CURABLE RUBBER-BASED PRESSURE-SENSITIVE ADHESIVE

(71) Applicant: 3M INNOVATIVE PROPERTIES COMPANY, St. Paul, MN (US)

(72) Inventors: Silke D. Mechernich, Neuess (DE); Mareike Richter, Dusseldorf (DE); Pierre R. Bieber, Dusseldorf (DE); Petra M. Stegmaier, Dusseldorf (DE)

(73) Assignee: 3M Innovative Properties Company, St. Paul, MN (US)

( * ) Notice: Subject to any disclaimer, the term of this patent is extended or adjusted under 35 U.S.C. 154(b) by 204 days.

(21) Appl. No.: 15/522,675

(22) PCT Filed: Nov. 5, 2015

(86) PCT No.: PCT/US2015/059138
§ 371 (c)(1),
(2) Date: Apr. 27, 2017

(87) PCT Pub. No.: WO2016/077131
PCT Pub. Date: May 19, 2016

(65) Prior Publication Data
US 2017/0355885 A1 Dec. 14, 2017

(30) Foreign Application Priority Data
Nov. 14, 2014 (EP) .................................. 14193191

(51) Int. Cl.
| | |
|---|---|
| *C09J 11/06* | (2006.01) |
| *C08K 3/24* | (2006.01) |
| *C08K 5/3412* | (2006.01) |
| *C09J 121/00* | (2006.01) |
| *C09J 109/06* | (2006.01) |
| *C09J 123/22* | (2006.01) |
| *C08K 3/30* | (2006.01) |

(52) U.S. Cl.
CPC .................. *C09J 11/06* (2013.01); *C08K 3/24* (2013.01); *C08K 5/3412* (2013.01); *C09J 109/06* (2013.01); *C09J 121/00* (2013.01); *C09J 123/22* (2013.01); *C08K 2003/309* (2013.01)

(58) Field of Classification Search
CPC ........ C09J 11/06; C09J 109/06; C09J 123/22; C08K 3/24; C08K 5/3412
See application file for complete search history.

(56) References Cited

U.S. PATENT DOCUMENTS

| | | |
|---|---|---|
| 3,453,242 A | 7/1969 | Schmitt |
| 5,089,536 A | 2/1992 | Palazzotto |
| 5,296,547 A | 3/1994 | Nestegard |
| 5,393,787 A | 2/1995 | Nestegard |
| 5,569,691 A | 10/1996 | Guggenberger |
| 5,605,964 A | 2/1997 | Groves |
| 5,677,376 A | 10/1997 | Groves |
| 5,721,289 A | 2/1998 | Karim |
| 5,804,610 A | 9/1998 | Hamer |
| 6,383,279 B1 | 5/2002 | Eckhardt |
| 6,630,536 B2 | 10/2003 | Kuniya |
| 7,163,741 B2 | 1/2007 | Khandpur |
| 7,910,163 B2 | 3/2011 | Zollner |
| 7,935,383 B2 | 5/2011 | Zollner |
| 8,063,141 B2 | 11/2011 | Fisher |
| 8,449,962 B2 | 5/2013 | Prenzel |
| 8,673,995 B2 | 3/2014 | Chatterjee |
| 8,802,777 B2 | 8/2014 | Zollner |
| 9,505,959 B2 | 11/2016 | Grittner |
| 2003/0082362 A1 | 5/2003 | Khandpur |
| 2004/0082700 A1 | 4/2004 | Khandpur |
| 2004/0242985 A1* | 12/2004 | Axelgaard ......... A61B 5/04087 600/391 |
| 2005/0043468 A1 | 2/2005 | Fisher |
| 2005/0288436 A1 | 12/2005 | Ring |
| 2008/0032231 A1 | 2/2008 | Hatakeyama |
| 2008/0070053 A1 | 3/2008 | Schmierer |
| 2008/0318167 A1 | 12/2008 | Kim |
| 2010/0075092 A1 | 3/2010 | Kendra |
| 2011/0076493 A1 | 3/2011 | Kavanagh |
| 2011/0178248 A1* | 7/2011 | Kavanagh .............. C09J 133/10 525/194 |
| 2011/0274843 A1 | 11/2011 | Grittner |
| 2011/0281964 A1 | 11/2011 | Zmarsly |
| 2012/0029105 A1 | 2/2012 | Czerwonatis |
| 2012/0322910 A1 | 12/2012 | Chatterjee |

(Continued)

FOREIGN PATENT DOCUMENTS

| | | |
|---|---|---|
| CN | 101880352 | 11/2010 |
| CN | 104177997 | 12/2014 |

(Continued)

OTHER PUBLICATIONS

1507 Extended European Search Report for EP 14193191.5, date of completion of search May 19, 2015, 4 pages.
International Search Report for PCT International Application No. PCT/US2015/059138 dated Feb. 4, 2016, 4 pages.
Handbook of Polymer Foams, David Eaves, editor, published by Shawbury, Shrewsbury, Shropshire, UK: Rapra Technology, 2004; 10 pages.

(Continued)

*Primary Examiner* — Daniel McNally
(74) *Attorney, Agent, or Firm* — Jean A. Lown

(57) ABSTRACT

The present disclosure is directed to a curable precursor of a pressure sensitive adhesive comprising a) a (co)polymeric material comprising a rubber-based elastomeric material; b) a polyfunctional aziridine curing agent; and c) an acid generating agent. The present disclosure is also directed to a method of manufacturing such pressure sensitive adhesives and uses thereof.

18 Claims, No Drawings

(56) References Cited

U.S. PATENT DOCUMENTS

| | | | |
|---|---|---|---|
| 2013/0090588 A1 | 4/2013 | Buus | |
| 2014/0057091 A1 | 2/2014 | Krawinkel | |
| 2016/0312080 A1* | 10/2016 | Richter | ............ C07D 203/08 |

FOREIGN PATENT DOCUMENTS

| | | |
|---|---|---|
| DE | 202009013255 | 2/2010 |
| EP | 0739626 | 10/1996 |
| EP | 0798354 | 10/1997 |
| EP | 0879863 | 11/1998 |
| EP | 0968712 | 1/2000 |
| EP | 0752435 | 9/2003 |
| EP | 1676895 | 7/2006 |
| EP | 2094801 | 9/2009 |
| EP | 2368953 | 9/2011 |
| EP | 2832779 | 2/2015 |
| JP | 2002-356665 | 12/2002 |
| WO | WO 2001/44400 | 6/2001 |
| WO | WO 2003/002684 | 1/2003 |
| WO | WO 2003/018702 | 3/2003 |
| WO | WO 2006/027387 | 3/2006 |
| WO | WO 2008/073669 | 6/2008 |
| WO | WO 2008/128246 | 10/2008 |
| WO | WO 2009/152126 | 12/2009 |
| WO | WO 2011/157278 | 12/2011 |
| WO | WO 2013/101827 | 7/2013 |
| WO | WO 2015/017400 | 2/2015 |
| WO | WO 2015/094710 | 6/2015 |
| WO | WO 2016/077132 | 5/2016 |
| WO | WO 2016/077133 | 5/2016 |

OTHER PUBLICATIONS

POCIUS, Adhesion and Adhesives Technology: An Introduction, 2nd Ed., Hanser Gardner Publications, Inc., Cincinnati, OH; 45 pages (2002).

* cited by examiner

POST-CURABLE RUBBER-BASED PRESSURE-SENSITIVE ADHESIVE

CROSS REFERENCE TO RELATED APPLICATIONS

This application is a national stage filing under 35 U.S.C. 371 of PCT/US2015/059138, filed Nov. 5, 2015, which claims the benefit of EP Application No. 14193191.5, filed Nov. 14, 2014, the disclosure of which is incorporated by reference in its/their entirety herein.

CROSS REFERENCE TO RELATED APPLICATION

This application claims the benefit of EP Patent Application No. 14193191.5, filed Nov. 14, 2014, the disclosure of which is incorporated by reference herein in its entirety.

TECHNICAL FIELD

The present disclosure relates generally to the field of adhesives, more specifically to the field of pressure sensitive adhesives (PSA). The present disclosure also relates to a method of manufacturing such pressure sensitive adhesives and uses thereof.

BACKGROUND

Adhesives have been used for a variety of marking, holding, protecting, sealing and masking purposes. Adhesive tapes generally comprise a backing, or substrate, and an adhesive. One type of adhesive which is particularly preferred for many applications is represented by pressure sensitive adhesives.

Pressure-sensitive tapes are virtually ubiquitous in the home and workplace. In its simplest configuration, a pressure-sensitive tape comprises an adhesive and a backing, and the overall construction is tacky at the use temperature and adheres to a variety of substrates using only moderate pressure to form the bond. In this fashion, pressure-sensitive tapes constitute a complete, self-contained bonding system.

Pressure sensitive adhesives (PSAs) are well known to one of ordinary skill in the art, and according to the Pressure-Sensitive Tape Council, PSAs are known to possess properties including the following: (1) aggressive and permanent tack, (2) adherence with no more than finger pressure, (3) sufficient ability to hold onto an adherend, and (4) sufficient cohesive strength. Materials that have been found to function well as PSAs include polymers designed and formulated to exhibit the requisite viscoelastic properties resulting in a desired balance of tack, peel adhesion, and shear holding power. PSAs are characterized by being normally tacky at room temperature (e.g., 20° C.). PSAs do not embrace compositions merely because they are sticky or adhere to a surface.

These requirements are assessed generally by means of tests which are designed to individually measure tack, adhesion (peel strength), and cohesion (shear holding power), as noted in A.V. Pocius in Adhesion and Adhesives Technology: An Introduction, $2^{nd}$ Ed., Hanser Gardner Publication, Cincinnati, Ohio, 2002. These measurements taken together constitute the balance of properties often used to characterize a PSA.

With broadened use of pressure-sensitive tapes over the years, performance requirements have become more demanding. Shear holding capability, for example, which originally was intended for applications supporting modest loads at room temperature, has now increased substantially for many applications in terms of operating temperature and load. When used as attachment devices for a variety of assembly and manufacturing applications, such as interior or exterior automotive mounting of panels and molding, or in the construction industry, pressure sensitive adhesives are additionally required to provide good adhesion performance to rough or irregular surfaces. In addition, many applications require pressure sensitive adhesives to support a load at elevated temperatures, typically in the range of from 70° C. to 90° C., for which high cohesive strengths are required. So-called high performance pressure-sensitive tapes are those capable of supporting loads at elevated temperatures for 10,000 minutes. Increased shear holding capability has generally been accomplished by crosslinking the PSA, although considerable care must be exercised so that high levels of tack and adhesion are retained in order to retain the aforementioned balance of properties.

In addition to increasing performance requirements with regard to pressure sensitive adhesives, volatile organic compounds (VOC) reduction regulations are becoming increasingly important in particular for various kind of interior applications (occupational hygiene and occupational safety) such as e.g. in the construction market or in the automotive or electronics industries. Known acrylate-based pressure sensitive adhesives typically contain notable amounts of low molecular weight organic residuals, such as un-reacted monomers arising from their polymerization process, polymerization initiator residuals, contaminations from raw materials or degradation products formed during the manufacturing process. These low molecular weight residuals qualifying as VOC may diffuse out of the adhesive tape and can be potentially harmful. Known acrylate-based pressure sensitive adhesives also generally suffer from lack of cohesive strength and excessive tendency to flow, when not crosslinked. This aspect may render the application and processability of uncrosslinked acrylate-based pressure sensitive adhesives particularly problematic, especially when made by a hotmelt process.

The reduction of organic solvent usage in the manufacturing process of pressure sensitive adhesives has quickly emerged as one straightforward means to reduce the overall VOC levels. The use of specific scavengers for organic contaminants, as described in WO 01/44400 (Yang), is another alternative way to achieve reduced VOC levels. However, the solutions for reducing overall VOC levels known from the prior art are often associated with increased manufacturing complexity and production costs.

It is therefore a recognized challenge in the adhesive tapes industry to combine good adhesion, good cohesion properties and low VOC levels. In order to optimize the adhesion of a PSA to a particular substrate, in particular an irregular substrate, an excellent surface wetting is necessary.

Partial solutions have been described in the art, whereby a non- or very low crosslinked adhesive is applied to a surface and then post-cured, so that, after an adequate surface wetting, the cohesive strength can be built up. In that context, the so-called "semi-structural tapes" described e.g. in U.S. Pat. No. 5,721,289 (Karim et al.) have been used. These systems are based on post-curable epoxy functionalities and specifically require using a superacid which is activated by UV irradiation as triggering energy. However, these known systems show undesired moisture sensitivity as the superacid needed for UV-induced cationic curing or crosslinking of the epoxy functionalities decomposes to hydronium ion, rendering ineffective the ring-opening polymerization of epoxies. Other known post-curable systems are based on the so-called "DICY-chemistry" described e.g. in EP-A1-0798354, wherein an epoxy-amine curing reaction is triggered with heat. However, these systems require a continuous heating step so as to maintain the curing reaction until the curing or crosslinking step has been completed. Patent applications US 2001/0076493-A1 (Kavanagh et al.) and US 2011/0178248-A1 (Kavanagh et al.) disclose pre-adhesive compositions comprising an aziridine crosslinking agent.

The commonly known curing or crosslinking systems do not often provide industrially viable solutions for the production of pressure sensitive adhesives having acceptable characteristics. Without contesting the technical advantages associated with the curing or crosslinking systems known in the art for producing pressure sensitive adhesives, there is still a need for a pressure sensitive adhesive provided with an excellent and versatile balance of adhesive and cohesive properties, in particular on uneven or irregular substrates, whilst ensuring reduced overall VOC levels.

Other advantages of the pressure sensitive adhesives and methods of the invention will be apparent from the following description.

SUMMARY

According to one aspect, the present disclosure relates to a curable precursor of a pressure sensitive adhesive comprising:
  a) a (co)polymeric material comprising a rubber-based elastomeric material;
  b) a polyfunctional aziridine curing agent; and
  c) an acid generating agent.

In another aspect, the present disclosure relates to a composite assembly comprising a substrate and a curable precursor of a pressure sensitive adhesive as above described applied onto at least part of the surface of the substrate, thereby forming a layer of a curable precursor of a pressure sensitive adhesive.

According to still another aspect of the present disclosure, it is provided a method of applying a pressure sensitive adhesive to a substrate, comprising the steps of:
  a) providing a curable precursor of a pressure sensitive adhesive comprising:
    i. a (co)polymeric material comprising a rubber-based elastomeric material;
    ii. a polyfunctional aziridine curing agent; and
    iii. optionally, an acid generating agent;
  b) applying the curable precursor of a pressure sensitive adhesive to at least part of the surface of the substrate; and
  c) curing the curable precursor of a pressure sensitive adhesive by allowing acid to be released into it.

In still another aspect, the present disclosure relates to the use of a curable precursor of a pressure sensitive adhesive as above-described, for the bonding to an uneven or irregular substrate. In yet another aspect, the present disclosure relates to the use of a curable precursor of a pressure sensitive adhesive as above-described, for industrial applications, in particular for automotive applications, in particular for taped seal on body applications.

DETAILED DESCRIPTION

According to a first aspect, the present disclosure relates to a curable precursor of a pressure sensitive adhesive comprising:
  a) a (co)polymeric material comprising a rubber-based elastomeric material;
  b) a polyfunctional aziridine curing agent; and
  c) an acid generating agent.

In the context of the present disclosure, it has surprisingly been found that a curable precursor of a pressure sensitive adhesive as described above is outstandingly suitable for producing post-cured pressure sensitive adhesives provided with an excellent and versatile balance of adhesive and cohesive properties, in particular on uneven or irregular substrates. The curable precursor of a pressure sensitive adhesive according to the disclosure is particularly suitable to perform on-demand post-curing, i.e. activatable and delayed in-place curing. In the context of the present disclosure, the acid generating agent for use herein acts as an activatable latent source of acid catalysts for cationic (ring-opening) polymerization of the polyfunctional aziridine curing agent, resulting in curing of the precursor of a pressure sensitive adhesive according to the disclosure.

Without wishing to be bound by theory, it is believed that the curing mechanism used to build up inner strength of the pressure sensitive adhesive involves the formation of an interpenetrating network involving the rubber-based elastomeric material and an aziridine network resulting from acid-catalyzed cationic ring-opening polymerization of polyfunctional aziridine monomeric units.

Still without wishing to be bound by theory, it is believed that the particular combination of a polyfunctional aziridine curing agent and an acid generating agent, allows providing excellent surface wetting characteristics to the precursor of a pressure sensitive adhesive on its uncured state, in particular on uneven or irregular substrates, which ultimately translates into providing excellent adhesives and cohesive properties to the pressure sensitive adhesive resulting from the curing of the precursor of the pressure sensitive adhesive.

The curable precursor of a pressure sensitive adhesive of the present disclosure may be cured in-place to produce a pressure sensitive adhesive provided with excellent characteristics directly on the desired substrate or article.

The use of the curable precursor composition and method of the present disclosure affords a number of advantages as compared to conventional post-curable compositions, such as e.g. those based on post-curable epoxy functionalities or on the so-called "DICY-chemistry". These advantages include, but are not limited to, insensitivity of the curable composition to moisture, and ability to perform post-curing of the curable precursor by short initiation with a suitable triggering energy (e.g. thermal energy or actinic radiation) without the necessity to provide a continuous source of triggering energy until the curing is completed.

The curable precursor of a pressure sensitive adhesive of the present disclosure may also be able to produce pressure sensitive adhesives provided with excellent characteristics and performance in terms of overall VOC levels reduction.

In addition, the cured pressure sensitive adhesives exhibit high cohesive strength, high temperature shear strength, and excellent stress relaxation properties. The pressure-sensitive adhesives according to the present disclosure, i.e. in the cured state, provide an advantageous balance of tack, peel adhesion, and shear holding power, and further conform to the Dahlquist criteria; i.e. the modulus of the adhesive at the application temperature, typically room temperature, is less than $3 \times 10^6$ dynes/cm at a frequency of 1 Hz.

The pressure sensitive adhesives according to the disclosure may find particular use for adhering e.g. automotive body side mouldings, weather strips, road signs, commercial signs, constructions, electrical cabinets, shell moulds, machine parts, junction boxes or backsheet solutions for photovoltaic modules. In a particular advantageous aspect, the pressure sensitive adhesives of the present disclosure may provide excellent adhesion properties on low surface energy substrates, such as polyolefin surfaces and clear coat surfaces. More particularly, the pressure sensitive adhesives disclosed herein may be advantageously bonded to automotive clear coat surfaces. As such, the pressure sensitive adhesives according to the present disclosure may be particularly suited for (industrial) interior applications, more in particular for construction market applications, automotive applications or electronic applications. In the context of automotive applications, the pressure sensitive adhesives as described herein may find particular use for adhering e.g. automotive body side mouldings, weather strips, roof linings or rearview mirrors. Pressure sensitive adhesives according to the present disclosure may also be provided with advantageous low fogging characteristics, which are particularly suited for electronic applications.

In the context of the present disclosure, the expression "low surface energy substrates" is meant to refer to those substrates having a surface energy of less than 34 dynes per centimeter. Included among such materials are polypropylene, polyethylene (e.g., high density polyethylene or HDPE), and blends of polypropylene (e.g. PP/EPDM, TPO). The surface energy is typically determined from contact angle measurements as described, for example, in AST™ D7490-08.

In the context of the present disclosure, the term "curing" is not meant to designate crosslinking, but is rather meant to refer to the formation of an interpenetrating polymer network structure, e.g. the interpenetrating network involving the rubber-based elastomeric material network and the aziridine polymeric network resulting from acid-catalyzed cationic ring-opening polymerization of polyfunctional aziridine monomeric units.

In the context of the present disclosure, and as is well known to those skilled in the art, the term "acid generating agent" is meant to refer to a latent source of acid catalysts for performing e.g. cationic (ring-opening) polymerization, and which is activatable by exposure to a suitable triggering energy (such as e.g. thermal energy or actinic radiation).

In the context of the present disclosure, the expression "rubber-based elastomeric material" is meant to refer to any non-acrylic based elastomeric material. Included among such materials are natural and synthetic rubbers.

Any commonly known rubber-based elastomeric material may be used in the context of the present disclosure. Suitable rubber-based elastomeric materials for use herein may be easily identified those skilled in the art, in the light of the present disclosure.

Non-limiting examples of rubber-based elastomeric material for use herein include natural rubbers, synthetic rubbers, thermoplastic elastomeric materials, non-thermoplastic elastomeric materials, thermoplastic hydrocarbon elastomeric materials, non-thermoplastic hydrocarbon elastomeric materials, and any combinations or mixtures thereof.

According to a particular aspect, the rubber-based elastomeric material for use herein is selected from the group consisting of halogenated butyl rubbers, in particular bromobutyl rubbers and chlorobutyl rubbers; halogenated isobutylene-isoprene copolymers; bromo-isobutylene-isoprene copolymers; chloro-isobutylene-isoprene copolymers; block copolymers; olefinic block copolymers; butyl rubbers; synthetic polyisoprene; ethylene-octylene rubbers; ethylene-propylene rubbers; ethylene-propylene random copolymers; ethylene-propylene-diene monomer rubbers; polyisobutylenes; poly(alpha-olefin); ethylene-alpha-olefin copolymers; ethylene-alpha-olefin block copolymers; styrenic block copolymers; styrene-isoprene-styrene block copolymers; styrene-butadiene-styrene block copolymers; styrene-ethylene/butadiene-styrene block copolymers; styrene-ethylene/propylene-styrene block copolymers; styrene-butadiene random copolymers; olefinic polymers and copolymers; ethylene-propylene random copolymers; ethylene-propylene-diene terpolymers, and any combinations or mixtures thereof.

According to a preferred aspect of the pressure sensitive adhesive of the present disclosure, the rubber-based elastomeric material for use herein is selected from the group consisting of halogenated isobutylene-isoprene copolymers; in particular bromo-isobutylene-isoprene copolymers, chloro-isobutylene-isoprene copolymers; olefinic block copolymers, in particular ethylene-octylene block copolymers, ethylene-propylene-butylene copolymers; styrene-isoprene-styrene block copolymers; styrene-butadiene-styrene block copolymers, and any combinations or mixtures thereof.

According to still another preferred aspect, the rubber-based elastomeric material for use herein is selected from the group consisting of halogenated isobutylene-isoprene copolymers; in particular bromo-isobutylene-isoprene copolymers, chloro-isobutylene-isoprene copolymers; olefinic block copolymers, in particular styrene-isoprene-styrene block copolymers, styrene-butadiene-styrene block copolymers, and any combinations or mixtures thereof.

The curable precursor according to the disclosure further comprises a polyfunctional aziridine curing agent. Suitable polyfunctional aziridine curing agents for use herein will be easily identified by those skilled in the art, in the light of the present description. As such, the polyfunctional aziridine curing agents for use herein are not particularly limited. Suitable polyfunctional aziridine curing agents for use herein are described e.g. in US-A1-2011/0178248 (Kavanagh et al.), the content of which is herewith incorporated by reference.

In one exemplary aspect, the polyfunctional aziridine curing agents comprise at least two aziridine functional groups, in particular two or three aziridine functional groups.

According to a particular aspect of the present disclosure, the polyfunctional aziridine curing agent for use herein has the following formula:

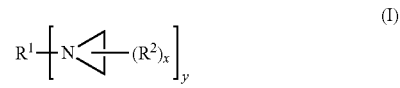

(I)

wherein
$R^1$ is a (hetero)hydrocarbyl group;
$R^2$ is an H or $C_1$-$C_{12}$ alkyl group, $C_1$-$C_8$ alkyl group, $C_1$-$C_6$ alkyl group, $C_1$-$C_4$ alkyl group, $C_1$-$C_2$ alkyl group, $C_6$-$C_{12}$ aromatic group, $C_6$-$C_{10}$ aromatic group, or even $C_6$-$C_7$ aromatic group; $C_2$-$C_{12}$ alkenyl group; $C_2$-$C_{12}$ alkinyl group; $C_7$-$C_{15}$ alkylaryl group; $C_7$-$C_{15}$ arylalkyl group or $C_3$-$C_{12}$ cycloalkyl group, and wherein hydrogen atoms can be replaced by Cl or F and/or wherein up to about 5 carbon atoms may be replaced by atoms or group of atoms selected from O, CO, N or S; preferably $R^2$ is H, $CH_2$, $C_2H_5$ or even phenyl group;

x is 0, 1 or 2, and
y is at least 1, preferably 1 to 4, or even 2 to 3.

According to another particular aspect of the present disclosure, the polyfunctional aziridine curing agent for use herein has the following formula:

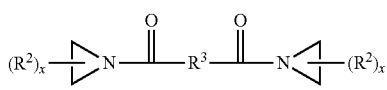
(II)

wherein
$R^3$ is a (hetero)hydrocarbyl group;
$R^2$ is an H or $C_1$-$C_{12}$ alkyl group, $C_1$-$C_8$ alkyl group, $C_1$-$C_6$ alkyl group, $C_1$-$C_4$ alkyl group, $C_1$-$C_2$ alkyl group, $C_6$-$C_{12}$ aromatic group, $C_6$-$C_{10}$ aromatic group, or even $C_6$-$C_7$ aromatic group;
preferably $R^2$ is H, $CH_2$, $C_2H_5$ or even phenyl group; and
x is 0, 1 or 2.

According to another particular aspect of the present disclosure, the polyfunctional aziridine curing agent for use herein has the following formula:

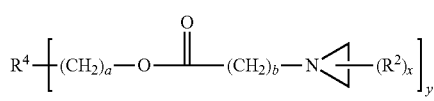
(III)

wherein
$R^4$ is a (hetero)hydrocarbyl group having a valency of y;
$R^2$ is an H or $C_1$-$C_{12}$ alkyl group, $C_1$-$C_8$ alkyl group, $C_1$-$C_6$ alkyl group, $C_1$-$C_4$ alkyl group, $C_1$-$C_2$ alkyl group, $C_6$-$C_{12}$ aromatic group, $C_6$-$C_{10}$ aromatic group, or even $C_6$-$C_7$ aromatic group;
preferably $R^2$ is H, $CH_2$, $C_2H_5$ or even phenyl group;
y is at least 1, preferably 1 to 4, or even 2 to 3;
x is 0, 1 or 2; and
each of a and b are independently 0 to 6, 0 to 4, or even 0 to 2.

According to still another particular aspect of the present disclosure, the polyfunctional aziridine curing agent for use herein has the following formula:

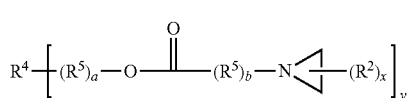
(IV)

wherein
$R^4$ is a (hetero)hydrocarbyl group having a valency of y;
$R^5$ and $R^6$ are independently (hetero)hydrocarbyl groups;
$R^2$ is an H or $C_1$-$C_{12}$ alkyl group, $C_1$-$C_8$ alkyl group, $C_1$-$C_6$ alkyl group, $C_1$-$C_4$ alkyl group, $C_1$-$C_2$ alkyl group, $C_6$-$C_{12}$ aromatic group, $C_6$-$C_{10}$ aromatic group, or even $C_6$-$C_7$ aromatic group;
preferably $R^2$ is H, $CH_2$, $C_2H_5$ or even phenyl group;
y is at least 1, preferably 1 to 4, or even 2 to 3;
x is 0, 1 or 2; and
each of a and b are independently 0 to 6, 0 to 4, or even 0 to 2.

According to still another particular aspect of the present disclosure, the polyfunctional aziridine curing agent for use herein has the following formula:

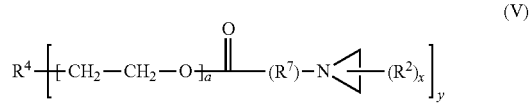
(V)

wherein
$R^4$ is a (hetero)hydrocarbyl group having a valency of y;
$R^7$ is a (hetero)hydrocarbyl group, in particular $C_2$-$C_{12}$ alkyl group, $C_2$-$C_8$ alkyl group, $C_2$-$C_6$ alkyl group, or even $CH_2$—$CHR'$—O-group, with R' being H or $CH_3$;
$R^2$ is an H or $C_1$-$C_{12}$-alkyl group, $C_1$-$C_8$ alkyl group, $C_1$-$C_6$ alkyl group, $C_1$-$C_4$ alkyl group, $C_1$-$C_2$ alkyl group, $C_6$-$C_{12}$ aromatic group, $C_6$-$C_{10}$ aromatic group, or even $C_6$-$C_7$ aromatic group;
preferably $R^2$ is H, $CH_2$, $C_2H_5$ or even phenyl group;
y is at least 1, preferably 1 to 4, or even 2 to 3;
x is 0, 1 or 2; and
a is 0 to 100, 1 to 50, 1 to 20 or even 1 to 10.

According to still another particular aspect of the present disclosure, the polyfunctional aziridine curing agent for use herein has the following formula:

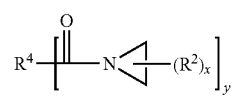
(VI)

wherein
$R^4$ is a hydrocarbyl group having a valency of y;
$R^2$ is an H or $C_1$-$C_{12}$ alkyl group, $C_1$-$C_8$ alkyl group, $C_1$-$C_6$ alkyl group, $C_1$-$C_4$ alkyl group, $C_1$-$C_2$ alkyl group, $C_6$-$C_{12}$ aromatic group, $C_6$-$C_{10}$ aromatic group, or even $C_6$-$C_7$ aromatic group;
preferably $R^2$ is H, $CH_2$, $C_2H_5$ or even phenyl group;
y is at least 1, preferably 1 to 4, or even 2 to 3; and
x is 0, 1 or 2.

According to still another particular aspect of the present disclosure, the polyfunctional aziridine curing agent for use herein has the following formula:

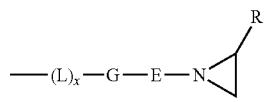
(VII)

wherein
R represents H, $C_1$-$C_{12}$ alkyl, $C_2$-$C_{12}$ alkenyl, $C_2$-$C_{12}$ alkinyl, $C_7$-$C_{15}$ alkylaryl, $C_7$-$C_{15}$ arylalkyl or $C_3$-$C_{12}$ cycloalkyl, and wherein hydrogen atoms can be replaced by Cl or F and/or wherein up to about 5 carbon atoms may be replaced by atoms or group of atoms selected from O, CO, N or S; E represents a $C_1$-$C_{18}$ branched or unbranched hydrocarbon chain wherein up to about 5 carbon atoms can be replaced by atoms or group of atoms selected from O, CO, N or S;
G represents a group selected from C(O)O, C(O)NR, C(O), C(O)C(O), C(O)$(CH_2)_m$C(O) with m=1 to 10, C(S)NR or $CH_2$;
L represents O, S or NR, with x=0 or 1.

Polyfunctional aziridine curing agents according to formula (VII) are for example described in U.S. Pat. Nos.

3,453,242 or 5,569,691 or 6,383,279 B1, the content of which is incorporated herewith by reference.

According to still another particular aspect of the present disclosure, the polyfunctional aziridine curing agents for use herein have the following formula:

A)

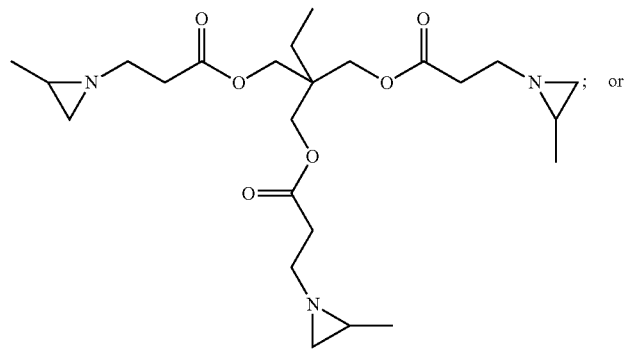

B)

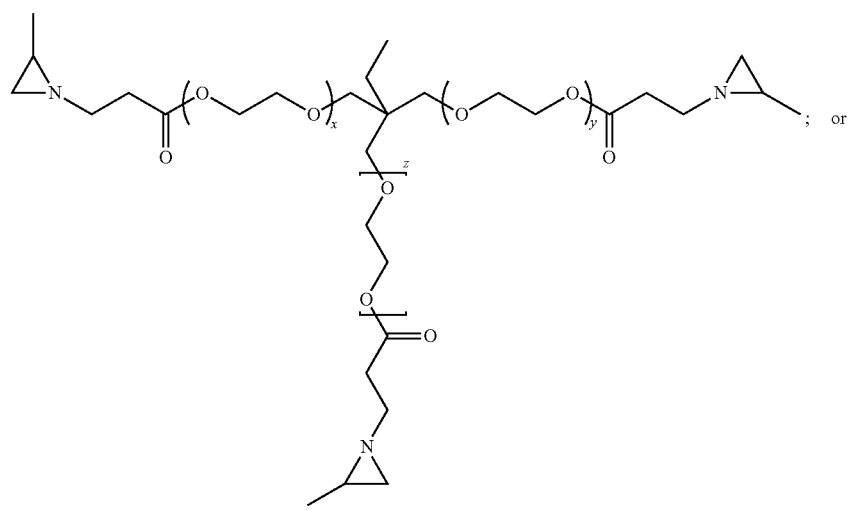

wherein x + y + z = 14

C)

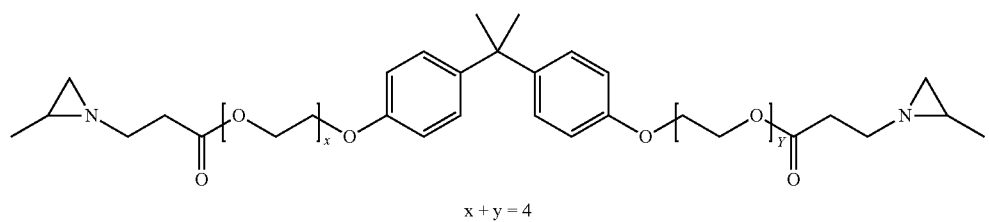

x + y = 4

The curable precursor according to the disclosure further comprises an acid generating agent. Suitable acid generating agents for use herein will be easily identified by those skilled in the art, in the light of the present description. As such, the acid generating agents for use herein are not particularly limited. Suitable acid generating agents for use herein are described e.g. in U.S. Pat. No. 5,089,536 (Palazzotto), US-A1-2011/0178248 (Kavanagh et al.) and U.S. Pat. No. 5,721,289 (Karim et al.) incorporated herein by reference.

In one typical aspect, the acid generating agents are selected from the group consisting of thermal acid generating agents, photo acid generating agents, and any combinations or mixtures thereof. As will be apparent to those skilled in the art, some acid generating agents may operate as both thermal- and photo acid generating agents.

Without wishing to be bound by theory, it is believed that the (super)acid generated by the acid generating agents initiates the ring-opening homopolymerization of the polyfunctional aziridine curing agents acting as monomeric units.

Suitable thermal acid generating agents are for example selected from the group consisting of quarternary blocked superacids, amine blocked superacids, and any combinations or mixtures thereof. Exemplary quarternary blocked superacids for use herein are quarternary blocked $SbF_6$, quarternary blocked triflic acid, and any combinations thereof. Exemplary suitable thermal acid generating agents are for example commercially available from King Industries under tradename K-Pure CXC and TAG series.

In a particular aspect, the acid generating agents for use herein are selected from the group consisting of quarternary blocked $SbF_6$, quarternary blocked triflic acid, quarternary blocked fluorosulfonic acids, and any combinations or mixtures thereof.

Suitable photo acid generating agents are for example selected from the group consisting of ionic salts of organometallic complexes and onium salts, in particular sulfonium and iodonium salts.

Exemplary organic onium salts for use herein are iodonium or sulfonium or phenyliodonium salts of the anions $BC_{24}F_{20}^-$, $SbF_6^-$, $PF_6^-$, $CF_3SO_3^-$ $C_4F_9SO_3^-$ and $C_8F_{17}SO_3^-$, and any combinations or mixtures thereof. Exemplary suitable photo acid generating agents are for example commercially available from Bluestar Silicones under tradename Rhodorsil 2074, from Wako Chemicals under tradename WPI 113 (Iodonium salt), from Hampford Research Inc. under tradename FP 5386, or from BASF under tradenames CGI 1907 or Irgacure 290 (Sulfonium salt).

The pressure sensitive adhesive of the present disclosure may optionally further comprise at least one hydrocarbon tackifier, wherein the hydrocarbon tackifier(s) preferably have a Volatile Organic Compound (VOC) value of less than 1000 ppm, less than 800 ppm, less than 600 ppm, less than 400 ppm or even less than 200 ppm, when measured by thermogravimetric analysis according to the weight loss test method described in the experimental section.

More preferably, the hydrocarbon tackifier(s) for use herein have a Volatile Fogging Compound (FOG) value of less than 1500 ppm, less than 1000 ppm, less than 800 ppm, less than 600 ppm, or even less than 500 ppm, when measured by thermogravimetric analysis according to the weight loss test method described in the experimental section.

Preferably still, the hydrocarbon tackifier(s) for use herein have an outgassing value of less than 1 wt %, less than 0.8 wt %, less than 0.6 wt %, less than 0.5 wt %, less than 0.4 wt %, less than 0.3 wt %, less than 0.2 wt % or even less than 0.1 wt %, when measured by weight loss analysis according to the oven outgassing test method described in the experimental section.

Any hydrocarbon tackifiers typically included in conventional pressure-sensitive adhesive compositions may be used in the context of the present disclosure, preferably when they fulfill the above-detailed VOC and/or FOG level requirements. Useful hydrocarbon tackifiers are typically selected to be miscible with the polymerizable material. Suitable hydrocarbon tackifier(s) for use herein may be easily identified by those skilled in the art, in the light of the present disclosure.

Either solid or liquid hydrocarbon tackifiers may be added, although solid hydrocarbon tackifiers are preferred. Solid tackifiers generally have a number average molecular weight (Mw) of 10,000 grams per mole or less and a softening point above about 70° C. Liquid tackifiers are viscous materials that have a softening point of about 0° C. to about 120° C.

Suitable tackifying resins may include terpene resins such as polyterpenes (e.g., alpha pinene-based resins, beta pinene-based resins, and limonene-based resins) and aromatic-modified polyterpene resins (e.g., phenol modified polyterpene resins); coumarone-indene resins; and petroleum-based hydrocarbon resins such as C5-based hydrocarbon resins, C9-based hydrocarbon resins, C5/C9-based hydrocarbon resins, and dicyclopentadiene-based resins. These tackifying resins, if added, can be hydrogenated to lower their color contribution to the particular pressure-sensitive adhesive composition. Combinations of various tackifiers can be used if desired, preferably when they fulfill the above-detailed VOC and/or FOG level requirements.

Tackifiers that are hydrocarbon resins can be prepared from various petroleum-based feed stocks. These feedstocks can be aliphatic hydrocarbons (mainly C5 monomers with some other monomers present such as a mixture of trans-1, 3-pentadiene, cis-1,3-pentadiene, 2-methyl-2-butene, dicyclopentadiene, cyclopentadiene, and cyclopentene), aromatic hydrocarbons (mainly $C_9$ monomers with some other monomers present such as a mixture of vinyl toluenes, dicyclopentadiene, indene, methylstyrene, styrene, and methylindenes), or mixtures thereof. Tackifiers derived from C5 monomers are referred to as C5-based hydrocarbon resins while those derived from C9 monomers are referred to as C9-based hydrocarbon resins. Some tackifiers are derived from a mixture of C5 and C9 monomers or are a blend of C5-based hydrocarbon tackifiers and C9-based hydrocarbon tackifiers. These tackifiers can be referred to as C5/C9-based hydrocarbon tackifiers. Any of these resins can be partially or fully hydrogenated to improve their color, their thermal stability or their process compatibility.

The C5-based hydrocarbon resins are commercially available from Eastman Chemical Company under the trade designations PICCOTAC and EASTOTAC, from Cray Valley under the trade designation WINGTACK, from Neville Chemical Company under the trade designation NEVTAC LX, and from Kolon Industries, Inc. under the trade designation HIKOREZ. The C5-based hydrocarbon resins are commercially available from Eastman Chemical with various degrees of hydrogenation under the trade designation EASTOTACK.

The C9-based hydrocarbon resins are commercially available from Eastman Chemical Company under the trade designation PICCO, KRISTLEX, PLASTOLYN, PICCOTAC, and ENDEX, from Cray Valley under the trade designations NORSOLENE, from Ruetgers N.V. under the trade designation NOVAREZ, and from Kolon Industries, Inc. under the trade designation HIKOTAC. These resins can be partially or fully hydrogenated. Prior to hydrogenation, the C9-based hydrocarbon resins are often about 40 percent aromatic as measured by proton Nuclear Magnetic Resonance. Hydrogenated C9-based hydrocarbon resins are commercially available, for example, from Eastman Chemical under the trade designations REGALITE and REGALREZ that are 50 to 100 percent (e.g., 50 percent, 70 percent, 90 percent, and 100 percent) hydrogenated. The partially hydrogenated resins typically have some aromatic rings.

Various C5/C9-based hydrocarbon tackifiers are commercially available from Arakawa under the trade designation ARKON, from Zeon under the trade designation QUINTONE, from Exxon Mobil Chemical under the trade designation ESCOREZ, and from Newport Industries under the trade designations NURES and H-REZ (Newport Industries). In the context of the present disclosure, suitable hydrocarbon tackifiers for use herein may be advantageously selected among those C5/C9-based hydrocarbon tackifiers commercially available from Exxon Mobil Chemical under the trade designation ESCOREZ.

According to a preferred aspect of the pressure sensitive adhesive of the present disclosure, the hydrocarbon tackifier for use herein is selected from the group consisting of aliphatic hydrocarbon resins, cycloaliphatic hydrocarbon resins, aromatic modified aliphatic and cycloaliphatic resins, aromatic resins, hydrogenated hydrocarbon resins, terpene and modified terpene resins, terpene-phenol resins, rosin esters, and any combinations or mixtures thereof.

In an advantageous aspect of the present disclosure, the tackifying resin is selected from the group consisting of C5-based hydrocarbon resins, C9-based hydrocarbon resins, C5/C9-based hydrocarbon resins, and any combinations or mixtures thereof. In another advantageous aspect, the tackifying resin is selected from the group consisting of hydrogenated terpene resins, hydrogenated rosin resins, hydrogenated C5-based hydrocarbon resins, hydrogenated C9-based hydrocarbon resins, hydrogenated C5/C9-based hydrocarbon resins, and any combinations or mixtures thereof.

Any of the hydrocarbon tackifiers may be used for example in amounts of up to 60 wt %, based on the weight of the pressure sensitive adhesive. In some aspects, the tackifiers can be used in amounts up to 55 wt %, up to 50 wt %, or up to 45 wt %, based on the weight of the pressure sensitive adhesive. The amount of tackifiers can be for example, in the range of from 5 wt % to 60 wt %, from 5 wt % to 50 wt %, from 10 wt % to 45 wt %, or even from 15 wt % to 45 wt %, based on the weight of the pressure sensitive adhesive.

According to an advantageous aspect, the pressure sensitive adhesive according to the present disclosure may further comprise, as an optional ingredient, a plasticizer. Any plasticizers typically known in conventional pressure-sensitive adhesive compositions, may be used in the context of the present disclosure.

Useful plasticizers are typically selected to be miscible with the other components in the composition such as the polymerizable material and any optional additives. Suitable plasticizers for use herein may be easily identified by those skilled in the art, in the light of the present disclosure. Typical examples of plasticizers that can be used herein include, but are not limited to, those selected from the group consisting of polyisobutylenes, mineral oils, ethylene propylene diene monomer rubbers, liquid hydrocarbon resins, various polyalkylene oxides (e.g., polyethylene oxides or propylene oxides), adipic acid esters, formic acid esters, phosphoric acid esters, benzoic acid esters, phthalic acid esters, sulfonamides, naphthenic oils, and any combinations or mixtures thereof.

According to a particular aspect of the present disclosure, the plasticizer is selected from the group consisting of polyisobutylenes, mineral oils, ethylene propylene diene monomer rubbers, liquid hydrocarbon resins, and any combinations or mixtures thereof. In a preferred aspect of the present disclosure, the plasticizer for use herein is selected from the group of polyisobutylene plasticizers.

Advantageously, the plasticizer(s) for use herein, in particular the polyisobutylene plasticizer(s), have a Volatile Organic Compound (VOC) value of less than 1000 ppm, less than 800 ppm, less than 600 ppm, less than 400 ppm or even less than 200 ppm, when measured by thermogravimetric analysis according to the weight loss test method described in the experimental section.

Advantageously still, the plasticizer(s) for use herein, in particular the polyisobutylene plasticizer(s), have a Volatile Fogging Compound (FOG) value of less than 2500 ppm, less than 2000 ppm, less than 1500 ppm, less than 1000 ppm, less than 800 ppm, less than 600 ppm, or even less than 500 ppm, when measured by thermogravimetric analysis according to the weight loss test method described in the experimental section.

Yet advantageously still, the plasticizer(s) for use herein, in particular the polyisobutylene plasticizer(s), have an outgassing value of less than 1 wt %, less than 0.8 wt %, less than 0.6 wt %, less than 0.5 wt %, less than 0.4 wt %, less than 0.3 wt %, less than 0.2 wt % or even less than 0.1 wt %, when measured by weight loss analysis according to the oven outgassing test method described in the experimental section.

In the context of the present disclosure, suitable plasticizers, in particular polyisobutylene plasticizers, for use herein may be advantageously selected among those commercially available from BASF under the trade designation OPPANOL B series.

The plasticizers, in particular polyisobutylene plasticizers, if present, may be used for example in amounts of up to 40 wt %, based on the weight of the pressure sensitive adhesive. In some aspects, the polyisobutylene plasticizers may be used in amounts up to 35 wt %, up to 30 wt %, or up to 25 wt %, based on the weight of the pressure sensitive adhesive. The amount of polyisobutylene plasticizers can be for example, in the range of from 1 wt % to 40 wt %, from 2 wt % to 30 wt %, or even from 5 wt % to 30 wt %, or even from 10 wt % to 25 wt %, based on the weight of the pressure sensitive adhesive.

In some aspects, the pressure sensitive adhesive of the present disclosure may further comprise, as an optional ingredient, a filler material. Such fillers may be advantageously used, for example, to increase the mechanical stability of the pressure sensitive adhesive and may also increase its shear and peel force resistance.

Any filler material commonly known to those skilled in the art may be used in the context of the present disclosure. Typical examples of filler material that can be used herein include, but are not limited to, those selected from the group consisting of expanded perlite, microspheres, expandable microspheres, ceramic spheres, zeolites, clay fillers, glass beads, hollow inorganic beads, silica type fillers, hydrophobic silica type fillers, hydrophilic silica type fillers, fumed silica, fibers, in particular glass fibers, carbon fibers, graphite fibers, silica fibers, ceramic fibers, electrically and/or thermally conducting particles, nanoparticles, in particular silica nanoparticles, and any combinations thereof.

In a preferred aspect of the present disclosure, the pressure sensitive adhesive further comprises at least one filler material which is selected from the group consisting of microspheres, expandable microspheres, preferably pentane filled expandable microspheres, gaseous cavities, glass beads, glass microspheres, glass bubbles and any combinations or mixtures thereof. More preferably, the at least one filler material for use herein is selected from the group consisting of expandable microspheres, glass bubbles, and any combinations or mixtures thereof.

The filler material for use herein may be present in the curable precursor of a pressure sensitive adhesive, in any suitable amounts. In some exemplary aspects, the filler material is present in amounts up to 30 parts by weight, up to 25 parts by weight, or even up to 20 parts by weight of the curable precursor of a pressure sensitive adhesive. In some other exemplary aspects, this amount is typically of at least 1 part by weight, or at least 3 parts by weight of the curable precursor of a pressure sensitive adhesive.

Accordingly, in some exemplary aspects, the filler material is present in amounts in a range of from 1 to 20 parts by weight, from 3 to 15 parts by weight, or even from 5 to 13 parts by weight of the curable precursor of a pressure sensitive adhesive. In some other exemplary aspects, the filler material is present in amounts in a range of from 1 to 20 parts by weight, from 2 to 15 parts by weight, or even from 2 to 10 parts by weight of the curable precursor of a pressure sensitive adhesive.

As will be apparent to those skilled in the art in the light of the present disclosure, other additives may optionally be included in the pressure sensitive adhesive to achieve any desired properties. Such additives include, but are not limited to, further tackifiers, pigments, toughening agents, reinforcing agents, fire retardants, antioxidants, and various stabilizers. The additives are typically added in amounts sufficient to obtain the desired end properties.

According to one particular aspect, the curable precursor according to any of the preceding claims comprises:
a) from 20 wt % to 80 wt %, from 25 wt % to 70 wt %, or even from 30 wt % to 60 wt % of the (co)polymeric material comprising a rubber-based elastomeric material, based on the weight of the pressure sensitive adhesive;
b) from 0.1 wt % to 30 wt %, from 0.5 wt % to 25 wt %, from 1 wt % to 20 wt %, from 2 wt % to 15 wt %, or even from 4 wt % to 12 wt % of a polyfunctional aziridine curing agent, based on the weight of the pressure sensitive adhesive;
c) from 0.01 wt % to 10 wt %, from 0.05 wt % to 8 wt %, from 0.1 wt % to 6 wt %, from 0.2 wt % to 4 wt %, or even from 0.4 wt % to 4 wt % of an acid generating agent, based on the weight of the pressure sensitive adhesive; and
d) optionally, from 5 wt % to 60 wt %, from 5 wt % to 50 wt %, from 10 wt % to 45 wt %, or even from 15 wt % to 40 wt %, or even from 20 wt % to 40 wt % of the hydrocarbon tackifier(s), based on the weight of the pressure sensitive adhesive;
e) optionally, from 1 wt % to 40 wt %, from 2 wt % to 30 wt %, from 4 wt % to 30 wt %, from 5 wt % to 25 wt %, or even from 5 wt % to 20 wt % of a plasticizer, in particular a polyisobutylene plasticizer, based on the weight of the pressure sensitive adhesive;
f) optionally, from 1 wt % to 30 wt %, from 1 wt % to 25 wt %, from 2 wt % to 20 wt %, from 2 wt % to 15 wt %, or even from 2 wt % to 10 wt % of a filler material, preferably selected from the group of expandable microspheres and glass hollow glass microspheres, based on the weight of the pressure sensitive adhesive.

According to an advantageous aspect, the curable precursor according to the present disclosure is a precursor of a pressure sensitive adhesive foam (layer).

In the context of the present disclosure, the term "polymeric foam" is meant to designate a material based on a polymer and which material comprises voids, typically in an amount of at least 5% by volume, typically from 10% to 55% by volume or from 10% to 45% by volume. The voids may be obtained by any of the known methods such as cells formed by gas. Alternatively, the voids may result from the incorporation of hollow fillers, such as hollow polymeric particles, hollow glass microspheres, hollow ceramic microspheres. According to another alternative aspect, the voids may result from the incorporation of heat expandable microspheres, preferably pentane filled expandable microspheres. The heat expandable microspheres for use herein may be expanded when the polymer melt passes an extrusion die. Polymer mixtures containing expandable microspheres may also be extruded at temperatures below their expansion temperature and expanded in a later step by exposing the tape to temperatures above the expansion temperature of the microspheres. Alternatively, the voids can result from the decomposition of chemical blowing agents.

A polymeric foam layer for use herein has for example a thickness comprised between 100 and 6000 μm, between 200 and 4000 μm, between 500 and 2000 μm, or even between 800 and 1500 μm. As will be apparent to those skilled in the art, in the light of the present description, the preferred thickness of the polymeric foam layer will be dependent on the intended application.

A polymeric foam layer typically has a density comprised between 0.30 g/cm$^3$ and 1.5 g/cm$^3$, between 0.45 g/cm$^3$ and 1.10 g/cm$^3$, between 0.50 g/cm$^3$ and 0.95 g/cm$^3$, between 0.60 g/cm$^3$ and 0.95 g/cm$^3$, or even between 0.70 g/cm$^3$ and 0.95 g/cm$^3$. This density is achieved by including voids or cells. Typically, the polymeric foam layer will comprise at least 5% of voids by volume and for example between 15 and 45% by volume, or between 20% and 45% by volume.

The voids or cells in the polymeric foam layer can be created in any of the known manners described in the art and include the use of a gas or blowing agent and/or incorporation of hollow fillers, such as hollow polymeric particles, hollow glass microspheres, hollow ceramic microspheres or expandable microspheres, preferably pentane filled expandable microspheres, into the composition for the polymeric foam layer.

The (co)polymeric material may be prepared by any conventional cationic or anionic polymerization method, well known to those skilled in the art.

As will be apparent to those skilled in the art, the curable precursor of a pressure sensitive adhesive according to the present disclosure may further include a variety of additional additives depending on the envisaged properties for the resulting cured pressure sensitive adhesive. Exemplary additional additives include, but are not limited to, one or more plasticizers, UV stabilizers, antistatic agents, colorants, antioxidants, fungicides, bactericides, organic and/or inorganic filler particles, pigments, processing agents, and any combinations thereof. Advantageously, the additional additives for use herein are non-polymerizable additives. As will be apparent to those skilled in the art, additional additives for use herein may be included at appropriate timing and in the appropriate polymeric or pre-polymeric matrix.

One exemplary method of preparing a curable precursor of a pressure sensitive adhesive comprises providing a rubber-based elastomeric material which is generally mixed/compounded with a polyfunctional aziridine curing agent; an acid generating agent; optionally, at least one hydrocarbon tackifier; optionally, a plasticizer; and optionally, a filler material. Preferably, the (co)polymeric material comprising a rubber-based elastomeric material is compounded with the polyfunctional aziridine curing agent, the acid generating agent, and optionally, the hydrocarbon tackifier, the plasticizer and the filler, as a hotmelt mixture.

The curable precursor composition of pressure sensitive adhesive, either as a solution or a hotmelt mixture, is easily coated upon suitable substrates, such as flexible backing materials, by conventional coating techniques, then optionally dried or allowed to cool down, to produce adhesive coated sheet materials. It is preferable to coat the curable precursor of pressure sensitive adhesive soon after preparation. The flexible backing material may be any material conventionally utilized as a tape backing, optical film or any other flexible material. As will be apparent to those skilled in the art, the backing material may further comprise a release coating, such as for example a silicone coating, which allows preparation of transfer tapes.

Adhesive articles may be prepared by coating the curable precursor composition of a pressure sensitive adhesive on a suitable support, such as a flexible backing. Examples of materials that can be included in the flexible backing include polyolefins such as polyethylene, polypropylene (including isotactic polypropylene), polystyrene, polyester, polyvinyl alcohol, poly(ethylene terephthalate), poly(butylene terephthalate), poly(caprolactam), poly(vinylidene fluoride), polylactides, cellulose acetate, and ethyl cellulose and the like. Commercially available backing materials useful in the invention include kraft paper (available from Monadnock Paper, Inc.); cellophane (available from Flexel Corp.); spunbond poly(ethylene) and poly(propylene), such as Tyvek™ and Typar™ (available from DuPont, Inc.); and porous films obtained from poly(ethylene) and poly(propylene), such as Teslin™ (available from PPG Industries, Inc.), and Cellguard™ (available from Hoechst-Celanese).

Backings may also be prepared of fabric such as woven fabric formed of threads of synthetic or natural materials such as cotton, nylon, rayon, glass, ceramic materials, and the like or nonwoven fabric such as air laid webs of natural or synthetic fibers or blends of these. The backing may also be formed of metal, metalized polymer films, or ceramic sheet materials may take the form of any article conventionally known to be utilized with pressure sensitive adhesive compositions such as labels, tapes, signs, covers, marking indicia, and the like.

The above-described precursor compositions are coated on a substrate using conventional coating techniques modified as appropriate to the particular substrate. For example, these compositions can be applied to a variety of solid substrates by methods such as roller coating, flow coating, dip coating, spin coating, spray coating, knife coating, and die coating. These various methods of coating allow the compositions to be placed on the substrate at variable thicknesses thus allowing a wider range of use of the compositions. Coating thicknesses may vary as previously described.

According to another aspect, the present disclosure relates to a cured pressure sensitive adhesive obtainable by curing the curable precursor as above-described. In this context, the curing step is preferably performed by allowing acid to be released into the curable precursor of a pressure sensitive adhesive.

In a preferred aspect of the cured pressure sensitive adhesive according to the disclosure, the curing step is performed by subjecting the curable precursor of a pressure sensitive adhesive to a triggering energy sufficient to allow the acid generating agent to release acid into the curable precursor of a pressure sensitive adhesive, and wherein the triggering energy is preferably selected from the group of thermal energy or actinic radiation, more preferably UV radiation.

In still another aspect of the present disclosure, it is provided a composite assembly comprising a substrate and a curable precursor of a pressure sensitive adhesive, as above-described, applied onto at least part of the surface of the substrate, thereby forming a layer of a curable precursor of a pressure sensitive adhesive.

According to an alternative execution of the composite assembly, the layer of a curable precursor of a pressure sensitive adhesive is cured, preferably by allowing acid to be released into the curable precursor of a pressure sensitive adhesive.

In a preferred aspect of the composite assembly according to the disclosure, the curing step is performed by subjecting the curable precursor of a pressure sensitive adhesive to a triggering energy sufficient to allow the acid generating agent to release acid into the curable precursor of a pressure sensitive adhesive, and wherein the triggering energy is preferably selected from the group of thermal energy or actinic radiation, more preferably UV radiation.

According to an advantageous aspect of the composite assembly, the layer of a curable precursor of a pressure sensitive adhesive takes the form of a polymeric foam layer. According to this beneficial aspect, properties/requirements of the overall composite assembly such as application issues, deforming issues and energy distribution may be advantageously addressed by appropriate formulation of this polymeric foam layer, while other properties such as adhesion (quick adhesion) can be adjusted by the formulation of other non-foam pressure sensitive adhesive layers (also commonly referred to as skin layers).

In a particular aspect, the pressure sensitive adhesive assembly of the present disclosure is in the form of a multilayer pressure sensitive adhesive assembly further comprising a second pressure sensitive adhesive layer adjacent to the pressure sensitive adhesive foam layer, and preferably in-between the substrate and the pressure sensitive adhesive foam layer.

In some aspects, it may be advantageous for the multilayer pressure sensitive adhesive assemblies of the present disclosure to further comprise a third pressure sensitive adhesive layer which is preferably adjacent to the pressure sensitive adhesive foam layer in the side of the pressure sensitive adhesive foam layer which is opposed to the side of the pressure sensitive adhesive foam layer adjacent to the second pressure sensitive adhesive layer, and thereby forming a three-layered multilayer pressure sensitive adhesive assembly.

Three-layered multilayer pressure sensitive adhesive assemblies according to one aspect of the disclosure, may advantageously take the form of a skin/core/skin multilayer pressure sensitive adhesive assembly, wherein the pressure sensitive adhesive foam layer is the core layer of the multilayer pressure sensitive adhesive assembly, the second pressure sensitive adhesive layer is the first skin layer of the multilayer pressure sensitive adhesive assembly and the third pressure sensitive adhesive layer is the second skin layer of the multilayer pressure sensitive adhesive assembly.

The second pressure sensitive adhesive layer and/or the third pressure sensitive adhesive layer may have any composition commonly known in the art. As such, the composition of these various layers for use in the multilayer pressure sensitive adhesive assemblies of the present disclosure is not particularly limited.

In a particular aspect, the second pressure sensitive adhesive layer and/or the third pressure sensitive adhesive layer comprise a polymer base material selected from the group consisting of polyacrylates, polyurethanes, polyolefins, polyamines, polyamides, polyesters, polyethers, polyisobutylene, polystyrenes, polyvinyls, polyvinylpyrrolidone, natural rubbers, synthetic rubbers, and any combinations, copolymers or mixtures thereof.

According to a typical aspect, the second pressure sensitive adhesive layer and/or the third pressure sensitive adhesive layer comprise a polymer base material selected from rubber-based elastomeric materials, which may be identical, different or similar to those rubber-based elastomeric materials described above for use in the manufacturing of the curable precursor of a pressure sensitive adhesive.

In another typical aspect, the second pressure sensitive adhesive layer and/or the third pressure sensitive adhesive layer comprise a polymer base material selected from the group consisting of polyacrylates, polyurethanes, and any combinations, copolymers or mixtures thereof. According to still another typical aspect, the second pressure sensitive adhesive layer and/or the third pressure sensitive adhesive layer comprise a polymer base material selected from the group consisting of polyacrylates, and any combinations, copolymers or mixtures thereof.

According to a preferred aspect of the pressure sensitive adhesive assemblies of the present disclosure, the second pressure sensitive adhesive layer and/or the third pressure sensitive adhesive layer comprises a polymer base material selected from the group consisting of polyacrylates whose main monomer component preferably comprises a linear or branched alkyl (meth)acrylate ester, preferably a non-polar linear or branched alkyl (meth)acrylate ester having a linear or branched alkyl group comprising preferably from 1 to 32, from 1 to 20, or even from 1 to 15 carbon atoms.

As used herein, the term "alkyl (meth)acrylate" and "alkyl (meth)acrylate ester" are used interchangeably. The term "(meth)acrylate" refers to an acrylate, methacrylate, or both. The term "(meth)acrylic" refers to methacrylic, acrylic, or both. A "(meth)acrylic-based" material refers to one prepared from one or more monomers having a (meth)acryloyl group, which is a group of formula $CH_2=C(R)-(CO)-$ where R is hydrogen or methyl.

The term "alkyl" refers to a monovalent group which is a saturated hydrocarbon. The alkyl can be linear, branched, cyclic, or combinations thereof and typically has 1 to 32 carbon atoms. In some embodiments, the alkyl group contains 1 to 25, 1 to 20, 1 to 18, 1 to 12, 1 to 10, 1 to 8, 1 to 6, or 1 to 4 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, 2-ethylhexyl, 2-octyl and 2-propylheptyl.

According to a preferred aspect of the pressure sensitive adhesive assemblies of the present disclosure, the second pressure sensitive adhesive layer and/or the third pressure sensitive adhesive layer comprises a polymer base material selected from the group consisting of polyacrylates whose main monomer component comprises a linear or branched alkyl (meth)acrylate ester selected from the group consisting of methyl (meth)acrylate, ethyl (meth)acrylate, n-propyl (meth)acrylate, isopropyl (meth)acrylate, n-butyl acrylate, isobutyl acrylate, tert-butyl (meth)acrylate, n-pentyl (meth) acrylate, iso-pentyl (meth)acrylate, n-hexyl (meth)acrylate, iso-hexyl (meth)acrylate, cyclohexyl (meth)acrylate, phenyl (meth)acrylate, octyl (meth)acrylate, iso-octyl (meth)acrylate, 2-octyl(meth)acrylate, 2-ethylhexyl (meth)acrylate, decyl (meth)acrylate, lauryl (meth)acrylate, 2-propylheptyl (meth)acrylate, stearyl (meth)acrylate, isobornyl acrylate, benzyl (meth)acrylate, octadecyl acrylate, nonyl acrylate, dodecyl acrylate, isophoryl (meth)acrylate, and any combinations or mixtures thereof.

In a more preferred aspect, the linear or branched alkyl (meth)acrylate ester for use herein is selected from the group consisting of iso-octyl (meth)acrylate, 2-ethylhexyl (meth) acrylate, 2-propylheptyl (meth)acrylate, 2-octyl (meth)acrylate, butyl acrylate, and any combinations or mixtures thereof; more preferably from the group consisting of iso-octyl acrylate, 2-ethylhexyl acrylate, 2-octyl acrylate and 2-propylheptyl acrylate.

Advantageously, the composite assembly according to the present disclosure is an adhesive article, wherein the substrate is preferably a flexible backing layer. In an alternatively advantageous aspect, the substrate is a non-releasable substrate.

According to a particularly preferred aspect, the substrate for use herein is provided with an uneven surface. In the context of the present disclosure, the expressions "uneven surface" and "irregular surface" are used interchangeably, and are typically meant to refer to a surface which is discontinuous and/or non-flat and/or non-horizontal.

Throughout the present disclosure, the expression "uneven surface" is preferably intended to refer to a surface typically provided with at least one structure selected from the group consisting of cavities, holes, apertures, orifices, pits, openings, gaps, troughs, edges, depressions, elevations, and any combinations thereof.

According to an alternative aspect of the present disclosure, the uneven surface for use herein is selected from the group of curved surfaces, bended surfaces, twisted surfaces, angled surfaces, arched surfaces, arced surfaces, and any combinations thereof. In a particular aspect, the uneven surface is selected from the group of radii parts in car body, in particular radii panels.

In that context, the application of PSA foam tapes to uneven or irregular surfaces is a recognized challenge, since the conformability of the adhesive tape is limited. In some specialized applications, such as taped seal on body and weather-strip tape applications for the automotive industry, successful tape application is rather challenging, especially in small radii in car bodies and critical topologies such as spot welds or other surface structures, since the adhered tape needs to combine two rather contradicting requirements. On the one hand, the tape has to resist high deformation forces, therefore high stress relaxation capabilities and good cohesive strength are required. On the other hand, the same unique tape needs to provide sufficient conformability to the uneven or irregular surface, and therefore excellent surface wetting capabilities are required for the tape.

Other uneven surfaces for use herein may be easily identified by those skilled in the art, in the light of the present disclosure. Materials for forming substrates provided with uneven surfaces are not particularly limited. Exemplary main materials used for forming substrates provided with uneven surfaces are typically selected from the group consisting of metals, plastics, reinforced plastics, composite materials, glass materials, clear coats, wood, coatings, and any combinations thereof.

In the context of the present disclosure, uneven surfaces provided on living substrates such as, for example, parts of human or animal bodies are typically excluded. Exemplary substrates provided with an uneven surface may typically be found in the automotive manufacturing industry, in the aerospace manufacturing industry, or in the construction industry.

According to an advantageous aspect, the pressure sensitive adhesive as described above or the pressure sensitive adhesive assembly as described above, has a Volatile Organic Compound (VOC) value of less than 5000 ppm, less than 3000 ppm, less than 2000 ppm, or even less than 1500 ppm, when measured by thermogravimetric analysis according to the weight loss test method described in the experimental section.

Advantageously still, the curable precursor of a pressure sensitive adhesive or a cured pressure sensitive adhesive or a composite assembly as described above, has a Volatile Fogging Compound (FOG) value of less than 4000 ppm, less than 3000 ppm, less than 2500 ppm, less than 2000 ppm, or even less than 1500 ppm, when measured by thermogravimetric analysis according to the weight loss test method described in the experimental section.

The present disclosure is further directed to a method of applying a pressure sensitive adhesive to a substrate, comprising the steps of:
  a) providing a curable precursor of a pressure sensitive adhesive comprising:
    i. a (co)polymeric material comprising a rubber-based elastomeric material;

ii. a polyfunctional aziridine curing agent; and
iii. optionally, an acid generating agent;
b) applying the curable precursor of a pressure sensitive adhesive to at least part of the surface of the substrate; and
c) curing the curable precursor of a pressure sensitive adhesive by allowing acid to be released into it.

According to another aspect, the present disclosure is directed to a method of applying a pressure sensitive adhesive to a substrate, comprising the steps of:
a) providing a curable precursor of a pressure sensitive adhesive comprising:
i. a (co)polymeric material comprising a rubber-based elastomeric material;
ii. a polyfunctional aziridine curing agent; and
iii. optionally, an acid generating agent;
b) partially curing the curable precursor of a pressure sensitive adhesive by allowing acid to be released into it;
c) applying the partially cured pressure sensitive adhesive to at least part of the surface of the substrate; and
d) allowing the partially cured pressure sensitive adhesive to fully cure onto the substrate.

In a preferred aspect of the methods of applying a pressure sensitive adhesive to a substrate, as described above, the curing step is performed by subjecting the curable precursor of a pressure sensitive adhesive to a triggering energy sufficient to allow the acid generating agent to release acid into the curable precursor of a pressure sensitive adhesive, and wherein the triggering energy is preferably selected from the group of thermal energy or actinic radiation, more preferably UV radiation.

In an alternative execution of the methods of applying a pressure sensitive adhesive to a substrate, as described above, the curing step is performed by contacting the curable precursor of a pressure sensitive adhesive with a source of acid.

Suitable source of acids for use herein may be easily identified by those skilled in the art, in the light of the present disclosure. Suitable examples of sources of acid are for example selected from the group consisting of acid-containing compositions, acid-containing layers, acid-containing priming compositions, and any combinations or mixtures thereof.

In still another aspect of the present disclosure, it is provided a method of manufacturing a curable precursor of a pressure sensitive adhesive, comprising the step of providing a composition comprising:
a) a (co)polymeric material comprising a rubber-based elastomeric material;
b) a polyfunctional aziridine curing agent; and
c) an acid generating agent.

In yet another aspect of the present disclosure, it is provided a method of manufacturing a cured pressure sensitive adhesive, comprising the steps of:
a) providing a curable precursor of a pressure sensitive adhesive comprising:
i. a (co)polymeric material comprising a rubber-based elastomeric material;
ii. a polyfunctional aziridine curing agent; and
iii. optionally, an acid generating agent; and
b) curing the curable precursor of a pressure sensitive adhesive by allowing acid to be released into it.

In a preferred aspect of the method of manufacturing a cured pressure sensitive adhesive, as described above, the curing step is performed by subjecting the curable precursor of a pressure sensitive adhesive to a triggering energy sufficient to allow the acid generating agent to release acid into the curable precursor of a pressure sensitive adhesive, and wherein the triggering energy is preferably selected from the group of thermal energy or actinic radiation, more preferably UV radiation.

In an alternative execution of the method of manufacturing a cured pressure sensitive adhesive, as described above, the curing step is performed by contacting the curable precursor of a pressure sensitive adhesive with a source of acid.

Suitable source of acids for use herein may be easily identified by those skilled in the art, in the light of the present disclosure. Suitable examples of sources of acid are for example selected from the group consisting of acid-containing compositions, acid-containing layers, acid-containing priming compositions, and any combinations or mixtures thereof.

In a particular execution, the method of manufacturing a cured pressure sensitive adhesive, as described above, comprises the steps of:
a) compounding a rubber-based elastomeric material; a polyfunctional aziridine curing agent; optionally, an acid generating agent; optionally, at least one hydrocarbon tackifier; optionally, a plasticizer, in particular a polyisobutylene plasticizer; and optionally, a filler material preferably selected from the group of expandable microspheres and glassbubbles; thereby forming a curable precursor of a pressure sensitive adhesive; and
b) optionally, curing the curable precursor of a pressure sensitive adhesive by allowing acid to be released into it.

According to an exemplary aspect of the method of manufacturing a cured pressure sensitive adhesive according to the present disclosure, the method is a solvent-free method. By solvent-free method, it is herein meant to reflect that there is substantially no added solvent during the processing steps of the method of manufacturing the pressure sensitive adhesive.

In a particular aspect, the method of manufacturing a pressure sensitive adhesive comprises a hotmelt processing step, preferably a continuous hotmelt mixing processing step, more preferably a hotmelt extrusion processing step, in particular a twin screw hotmelt extrusion processing step.

In the context of the present disclosure, the curable precursor of a pressure sensitive adhesives, the (co)polymeric material comprising a rubber-based elastomeric material, the polyfunctional aziridine curing agents, and the optional acid generating agents for use in the methods as described above are identical to those described above with respect to the curable precursor of a pressure sensitive adhesive according to another aspect of the present disclosure.

The pressure sensitive adhesive of the present disclosure can be coated/applied upon a variety of substrates to produce adhesive-coated articles. The substrates can be flexible or inflexible and be formed of a polymeric material, glass or ceramic material, metal, or combinations thereof. Suitable polymeric substrates include, but are not limited to, polymeric films such as those prepared from polypropylene, polyethylene, polyvinyl chloride, polyester (polyethylene terephthalate or polyethylene naphthalate), polycarbonate, polymethyl(meth)acrylate (PMMA), cellulose acetate, cellulose triacetate, and ethyl cellulose. Foam backings may be used. Examples of other substrates include, but are not limited to, metal such as stainless steel, metal or metal oxide coated polymeric material, metal or metal oxide coated glass, and the like.

The pressure sensitive adhesives of the present disclosure may be used in any conventionally known article such as labels, tapes, signs, covers, marking indices, display components, touch panels, and the like. Flexible backing materials having microreplicated surfaces are also contemplated.

The pressure sensitive adhesives may be coated/applied on a substrate using any conventional coating techniques modified as appropriate to the particular substrate. For example, pressure sensitive adhesives may be applied/coated to a variety of solid substrates by methods such as roller coating, flow coating, dip coating, spin coating, spray coating knife coating, and die coating. These various methods of coating allow the pressure sensitive adhesives to be placed on the substrate at variable thicknesses thus allowing a wider range of use of the assemblies.

The substrate to which the pressure sensitive adhesive may be applied is selected depending on the particular application. For example, the pressure sensitive adhesive, in particular via its second and/or third pressure sensitive adhesive layer may be applied to sheeting products (e.g., decorative graphics and reflective products), label stock, and tape backings. Additionally, the pressure sensitive adhesive may be applied directly onto other substrates such as a metal panel (e.g., automotive panel) or a glass window so that yet another substrate or object can be attached to the panel or window. Accordingly, the pressure sensitive adhesive of the present disclosure may find a particular use in the automotive manufacturing industry (e.g., for attachment of exterior trim parts or for weatherstrips), in the construction industry or in the solar panel construction industry.

As such, the pressure sensitive adhesives according to the present disclosure are particularly suited for (industrial) interior applications, more in particular for construction market applications, automotive applications or electronic applications. In the context of automotive applications, the pressure sensitive adhesives as described herein may find particular use for adhering, for example, automotive body side mouldings, weather strips or rearview mirrors.

Accordingly, the present disclosure is further directed to the use of a curable precursor of a pressure sensitive adhesive or a cured pressure sensitive adhesive as described above for industrial applications, in particular for interior applications, in particular for construction market applications, electronic applications, and automotive applications, in particular for taped seal on body applications for the automotive industry.

In still another aspect, the present invention relates to the use of a curable precursor of a pressure sensitive adhesive or a cured pressure sensitive adhesive as above described, for the bonding to an uneven or irregular substrate.

In yet another aspect, the present invention relates to the use of a combination of a polyfunctional aziridine curing agent and an acid generating agent for preparing a cured pressure sensitive adhesive comprising a (co)polymeric material comprising a rubber-based elastomeric material.

Item 1 is a curable precursor of a pressure sensitive adhesive comprising:
  a) a (co)polymeric material comprising a rubber-based elastomeric material;
  b) a polyfunctional aziridine curing agent; and
  c) an acid generating agent.

Item 2 is the curable precursor according to item 1, wherein the rubber-based elastomeric material is selected from the group consisting of natural rubbers, synthetic rubbers, thermoplastic elastomeric materials, non-thermoplastic elastomeric materials, thermoplastic hydrocarbon elastomeric materials, non-thermoplastic hydrocarbon elastomeric materials, and any combinations or mixtures thereof.

Item 3 is curable precursor according to any of item 1 or 2, wherein the rubber-based elastomeric material is selected from the group consisting of halogenated butyl rubbers, in particular bromobutyl rubbers and chlorobutyl rubbers; halogenated isobutylene-isoprene copolymers; bromo-isobutylene-isoprene copolymers; chloro-isobutylene-isoprene copolymers; block copolymers; olefinic block copolymers; butyl rubbers; synthetic polyisoprene; ethylene-octylene rubbers; ethylene-propylene rubbers; ethylene-propylene random copolymers; ethylene-propylene-diene monomer rubbers; polyisobutylenes; poly(alpha-olefin); ethylene-alpha-olefin copolymers; ethylene-alpha-olefin block copolymers; styrenic block copolymers; styrene-isoprene-styrene block copolymers; styrene-butadiene-styrene block copolymers; styrene-ethylene/butadiene-styrene block copolymers; styrene-ethylene/propylene-styrene block copolymers; styrene-butadiene random copolymers; olefinic polymers and copolymers; ethylene-propylene random copolymers; ethylene-propylene-diene terpolymers, and any combinations or mixtures thereof.

Item 4 is a curable precursor according to any of the preceding items, wherein the rubber-based elastomeric material is selected from the group consisting of styrenic block copolymers; in particular styrene-isoprene-styrene block copolymers, styrene-butadiene-styrene block copolymers, styrene-ethylene/butadiene-styrene block copolymers, styrene-ethylene/propylene-styrene block copolymers, styrene-butadiene random copolymers; halogenated isobutylene-isoprene copolymers; in particular bromo-isobutylene-isoprene copolymers, chloro-isobutylene-isoprene copolymers; olefinic block copolymers, in particular ethylene-octylene block copolymers, ethylene-propylene-butylene copolymers, and any combinations or mixtures thereof.

Item 5 is a curable precursor according to any of the preceding items, wherein the polyfunctional aziridine curing agent comprises at least two aziridine functional groups, in particular two or four aziridine functional groups, more in particular three or four aziridine functional groups.

Item 6 is curable precursor according to any of the preceding items, wherein the polyfunctional aziridine curing agent has the following formula:

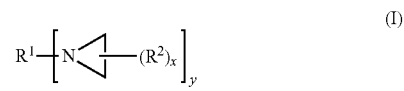

(I)

wherein
$R^1$ is a (hetero)hydrocarbyl group,
$R^2$ is an H or $C_1$-$C_{12}$ alkyl group, $C_1$-$C_8$ alkyl group, $C_1$-$C_6$ alkyl group, $C_1$-$C_4$ alkyl group, $C_1$-$C_2$ alkyl group, $C_6$-$C_{12}$ aromatic group, $C_6$-$C_{10}$ aromatic group, or even $C_6$-$C_7$ aromatic group; $C_2$-$C_{12}$ alkenyl group; $C_2$-$C_{12}$ alkinyl group; $C_7$-$C_{15}$ alkylaryl group; $C_7$-$C_{15}$ arylalkyl group or $C_3$-$C_{12}$ cycloalkyl group, and wherein hydrogen atoms can be replaced by Cl or F and/or wherein up to about 5 carbon atoms may be replaced by atoms or group of atoms selected from O, CO, N or S;
preferably $R^2$ is H, $CH_2$, $C_2H_5$ or even phenyl group;
x is 0, 1 or 2, and
y is at least 1, preferably 1 to 4, or even 2 to 3.

Item 7 is a curable precursor according to any of the preceding items, wherein the polyfunctional aziridine curing agent has the following formula:

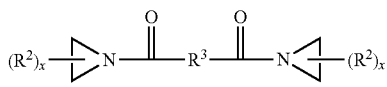
(II)

wherein
$R^3$ is a (hetero)hydrocarbyl group;
$R^2$ is an H or $C_1$-$C_{12}$ alkyl group, $C_1$-$C_8$ alkyl group, $C_1$-$C_6$ alkyl group, $C_1$-$C_4$ alkyl group, $C_1$-$C_2$ alkyl group, $C_6$-$C_{12}$ aromatic group, $C_6$-$C_{10}$ aromatic group, or even $C_6$-$C_7$ aromatic group;
preferably $R^2$ is H, $CH_2$, $C_2H_5$ or even phenyl group; and
x is 0, 1 or 2.

Item 8 is a curable precursor according to any of the preceding items, wherein the polyfunctional aziridine curing agent has the following formula:

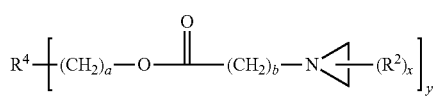
(III)

wherein
$R^4$ is a (hetero)hydrocarbyl group having a valency of y;
$R^2$ is an H or $C_1$-$C_{12}$ alkyl group, $C_1$-$C_8$ alkyl group, $C_1$-$C_6$ alkyl group, $C_1$-$C_4$ alkyl group, $C_1$-$C_2$ alkyl group, $C_6$-$C_{12}$ aromatic group, $C_6$-$C_{10}$ aromatic group, or even $C_6$-$C_7$ aromatic group;
preferably $R^2$ is H, $CH_2$, $C_2H_5$ or even phenyl group;
y is at least 1, preferably 1 to 4, or even 2 to 3;
x is 0, 1 or 2; and
each of a and b are independently 0 to 6, 0 to 4, or even 0 to 2.

Item 9 is a curable precursor according to any of the preceding items, wherein the polyfunctional aziridine curing agent has the following formula:

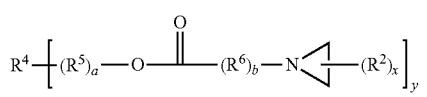
(IV)

wherein
$R^4$ is a (hetero)hydrocarbyl group having a valency of y;
$R^5$ and $R^6$ are independently (hetero)hydrocarbyl groups;
$R^2$ is an H or $C_1$-$C_{12}$ alkyl group, $C_1$-$C_8$ alkyl group, $C_1$-$C_6$ alkyl group, $C_1$-$C_4$ alkyl group, $C_1$-$C_2$ alkyl group, $C_6$-$C_{12}$ aromatic group, $C_6$-$C_{10}$ aromatic group, or even $C_6$-$C_7$ aromatic group;
preferably $R^2$ is H, $CH_2$, $C_2H_5$ or even phenyl group;
y is at least 1, preferably 1 to 4, or even 2 to 3;
x is 0, 1 or 2; and
each of a and b are independently 0 to 6, 0 to 4, or even 0 to 2.

Item 10 is a curable precursor according to any of the preceding claims, wherein the polyfunctional aziridine curing agent has the following formula:

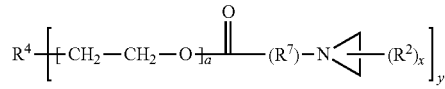
(V)

wherein
$R^4$ is a (hetero)hydrocarbyl group having a valency of y;
$R^7$ is a (hetero)hydrocarbyl group, in particular $C_2$-$C_{12}$ alkyl group, $C_2$-$C_8$ alkyl group, $C_2$-$C_6$ alkyl group, or even $CH_2$—CHR'—O-group, with R' being H or $CH_3$;
$R^2$ is an H or $C_1$-$C_{12}$ alkyl group, $C_1$-$C_8$ alkyl group, $C_1$-$C_6$ alkyl group, $C_1$-$C_4$ alkyl group, $C_1$-$C_2$ alkyl group, $C_6$-$C_{12}$ aromatic group, $C_6$-$C_{10}$ aromatic group, or even $C_6$-$C_7$ aromatic group;
preferably $R^2$ is H, $CH_2$, $C_2H_5$ or even phenyl group;
y is at least 1, preferably 1 to 4, or even 2 to 3;
x is 0, 1 or 2; and
a is 0 to 100, 1 to 50, 1 to 20 or even 1 to 10.

Item 11 is a curable precursor according to any of the preceding items, wherein the polyfunctional aziridine curing agent has the following formula:

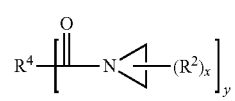
(VI)

wherein
$R^4$ is a hydrocarbyl group having a valency of y;
$R^2$ is an H or $C_1$-$C_{12}$ alkyl group, $C_1$-$C_8$ alkyl group, $C_1$-$C_6$ alkyl group, $C_1$-$C_4$ alkyl group, $C_1$-$C_2$ alkyl group, $C_6$-$C_{12}$ aromatic group, $C_6$-$C_{10}$ aromatic group, or even $C_6$-$C_7$ aromatic group;
preferably $R^2$ is H, $CH_2$, $C_2H_5$ or even phenyl group;
y is at least 1, preferably 1 to 4, or even 2 to 3; and
x is 0, 1 or 2.

Item 12 is a curable precursor according to any of the preceding items, wherein the polyfunctional aziridine curing agent has the following formula:

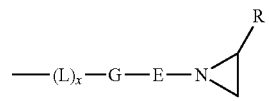
(VII)

wherein
R represents H, $C_1$-$C_{12}$ alkyl, $C_2$-$C_{12}$ alkenyl, $C_2$-$C_{12}$ alkinyl, $C_7$-$C_{15}$ alkylaryl, $C_7$-$C_{15}$ arylalkyl or $C_3$-$C_{12}$ cycloalkyl, and wherein hydrogen atoms can be replaced by Cl or F and/or wherein up to about 5 carbon atoms may be replaced by atoms or group of atoms selected from O, CO, N or S;
E represents a $C_1$-$C_{18}$ branched or unbranched hydrocarbon chain wherein up to about 5 carbon atoms can be replaced by atoms or group of atoms selected from O, CO, N or S;
G represents a group selected from C(O)O, C(O)NR, C(O), C(O)C(O), $C(O)(CH_2)_mC(O)$ with m=1 to 10, C(S)NR or $CH_2$;
L represents O, S or NR, with x=0 or 1.

Item 13 is a curable precursor according to any of the preceding items, wherein the polyfunctional aziridine curing agent has any the following formula:

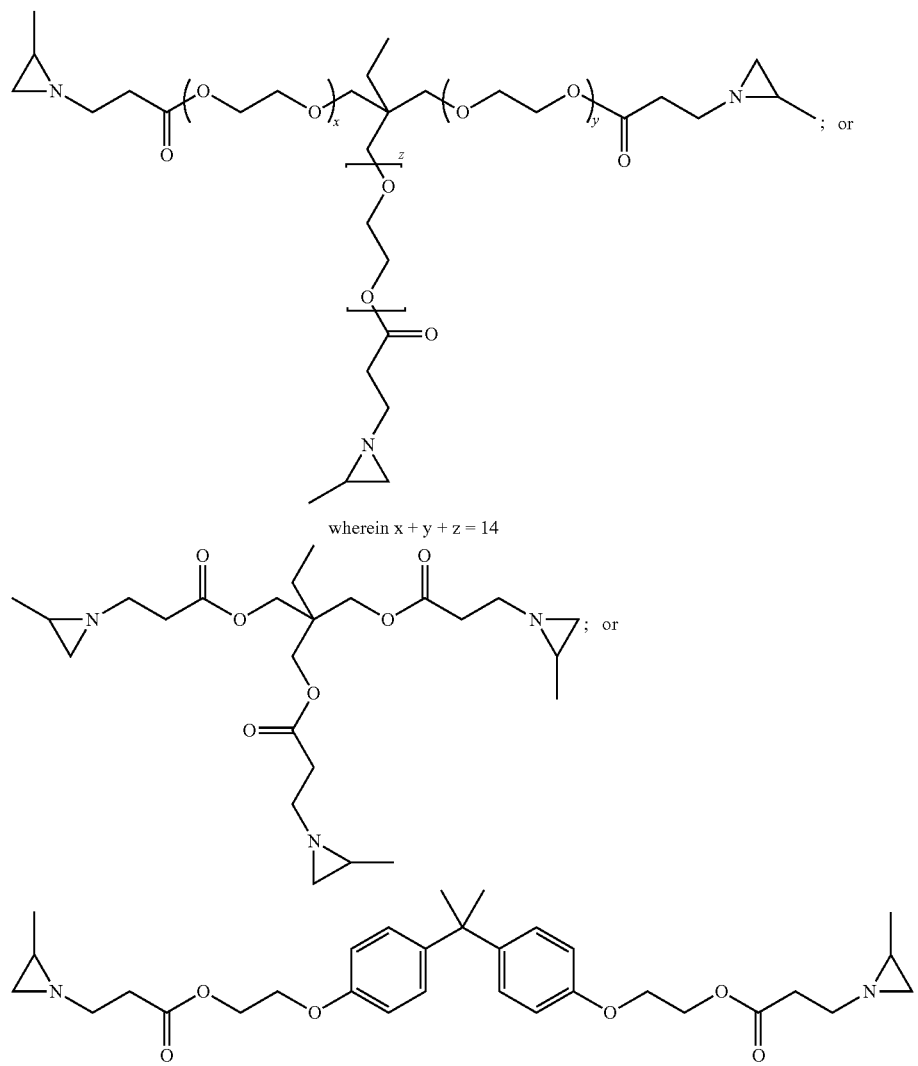

wherein x + y + z = 14

Item 14 is a curable precursor according to any of the preceding items, wherein the acid generating agent is selected from the group consisting of thermal acid generating agents, photo acid generating agents, and any combinations or mixtures thereof.

Item 15 is a curable precursor according to any of the preceding items, wherein the acid generating agent is a photo acid generating agent selected from the group consisting of ionic salts of organometallic complexes and onium salts, in particular iodonium or sulfonium salts, and any combinations or mixtures thereof.

Item 16 is a curable precursor according to any of the preceding items, wherein the acid generating agent is a photo acid generating agent selected from the group consisting of iodonium or sulfonium or phenyliodonium salts of the anions $BC_{24}F_{20}^-$, $SbF_6^-$, $PF_6^-$, $CF_3SO_3^-$, $C_4F_9SO_3^-$ and $C_8F_{17}SO_3^-$, and any combinations or mixtures thereof.

Item 17 is a curable precursor according to any of the preceding items, wherein the acid generating agent is a thermal acid generating agent selected from the group consisting of quarternary blocked superacids, amine blocked superacids, and any combinations or mixtures thereof.

Item 18 is a curable precursor according to any of the preceding items, wherein the acid generating agent is a thermal acid generating agent selected from the group consisting of quarternary blocked $SbF_6$, quarternary blocked triflic acid, quarternary blocked fluorosulfonic acids, and any combinations or mixtures thereof.

Item 19 is a curable precursor according to any of the preceding items, wherein the pressure sensitive adhesive further comprises at least one hydrocarbon tackifier, wherein the hydrocarbon tackifier(s) have a Volatile Organic Compound (VOC) value of less than 1000 ppm, when measured by thermogravimetric analysis according to the weight loss test methods described in the experimental section.

Item 20 is a curable precursor according to item 19, wherein the hydrocarbon tackifier(s) have a Volatile Organic Compound (VOC) value of less than 800 ppm, less than 600 ppm, less than 400 ppm or even less than 200 ppm, when measured by thermogravimetric analysis according to the weight loss test method described in the experimental section.

Item 21 is a curable precursor according to any of item 19 or 20, wherein the hydrocarbon tackifier(s) have a Volatile Fogging Compound (FOG) value of less than 1500 ppm, when measured by thermogravimetric analysis according to the weight loss test methods described in the experimental section.

Item 22 is a curable precursor according to item 21, wherein the hydrocarbon tackifier(s) have a Volatile Fogging Compound (FOG) value of less than 1000 ppm, less than 800 ppm, less than 600 ppm, or even less than 500 ppm, when measured by thermogravimetric analysis according to the weight loss test method described in the experimental section.

Item 23 is a curable precursor according to any of items 19 to 22, wherein the hydrocarbon tackifier(s) have an outgassing value of less than 1 wt %, less than 0.8 wt %, less than 0.6 wt %, less than 0.5 wt %, less than 0.4 wt %, less than 0.3 wt %, less than 0.2 wt % or even less than 0.1 wt %, when measured by weight loss analysis according to the oven outgassing test method described in the experimental section.

Item 24 is a curable precursor according to any of items 19 to 23, wherein the hydrocarbon tackifier is selected from the group consisting of aliphatic hydrocarbon resins, cycloaliphatic hydrocarbon resins, aromatic modified aliphatic and cycloaliphatic resins, aromatic resins, hydrogenated hydrocarbon resins, terpene and modified terpene resins, terpenephenol resins, rosin esters, and any combinations or mixtures thereof.

Item 25 is a curable precursor according to any of the preceding items, wherein the pressure sensitive adhesive further comprises a plasticizer, which is preferably selected from the group consisting of polyisobutylenes, mineral oils, ethylene propylene diene monomer rubbers, liquid hydrocarbon resins, and any combinations or mixtures thereof.

Item 26 is a curable precursor according to any of the preceding items, wherein the pressure sensitive adhesive further comprises a plasticizer selected from the group of polyisobutylene plasticizers.

Item 27 is a curable precursor according to any of item 25 or 26, wherein the plasticizer(s), in particular the polyisobutylene plasticizer(s), have a Volatile Organic Compound (VOC) value of less than 1000 ppm, less than 800 ppm, less than 600 ppm, less than 400 ppm or even less than 200 ppm, when measured by thermogravimetric analysis according to the weight loss test methods described in the experimental section.

Item 28 is a curable precursor according to any of items 25 to 27, wherein the plasticizer(s), in particular the polyisobutylene plasticizer(s), have a Volatile Fogging Compound (FOG) value of less than 2500 ppm, less than 2000 ppm, less than 1500 ppm, less than 1000 ppm, less than 800 ppm, less than 600 ppm, or even less than 500 ppm, when measured by thermogravimetric analysis according to the weight loss test method described in the experimental section.

Item 29 is a curable precursor according to any of items 25 to 28, wherein the plasticizer(s), in particular the polyisobutylene plasticizer(s), have an outgassing value of less than 1 wt %, less than 0.8 wt %, less than 0.6 wt %, less than 0.5 wt %, less than 0.4 wt %, less than 0.3 wt %, less than 0.2 wt % or even less than 0.1 wt %, when measured by weight loss analysis according to the oven outgassing test method described in the experimental section.

Item 30 is a curable precursor according to any of the preceding items, wherein the pressure sensitive adhesive further comprises at least one filler material which is preferably selected from the group consisting of microspheres; expandable microspheres, preferably pentane filled expandable microspheres; gaseous cavities; glass beads; glass microspheres; glass bubbles and any combinations or mixtures thereof; more preferably from the group consisting of expandable microspheres, glass bubbles, and any combinations or mixtures thereof.

Item 31 is a curable precursor according to item 30, wherein the at least one filler material is selected from the group consisting of expandable microspheres, glass bubbles, and any combinations or mixtures thereof.

Item 32 is a curable precursor according to any of the preceding items, which comprises:
  a) from 20 wt % to 80 wt %, from 25 wt % to 70 wt %, or even from 30 wt % to 60 wt % of the (co)polymeric material comprising a rubber-based elastomeric material, based on the weight of the pressure sensitive adhesive;
  b) from 0.1 wt % to 30 wt %, from 0.5 wt % to 25 wt %, from 1 wt % to 20 wt %, from 2 wt % to 15 wt %, or even from 4 wt % to 12 wt % of a polyfunctional aziridine curing agent, based on the weight of the pressure sensitive adhesive;
  c) from 0.01 wt % to 10 wt %, from 0.05 wt % to 8 wt %, from 0.1 wt % to 6 wt %, from 0.2 wt % to 4 wt %, or even from 0.4 wt % to 4 wt % of an acid generating agent, based on the weight of the pressure sensitive adhesive; and
  d) optionally, from 5 wt % to 60 wt %, from 5 wt % to 50 wt %, from 10 wt % to 45 wt %, or even from 15 wt % to 40 wt %, or even from 20 wt % to 40 wt % of the hydrocarbon tackifier(s), based on the weight of the pressure sensitive adhesive;
  e) optionally, from 1 wt % to 40 wt %, from 2 wt % to 30 wt %, from 4 wt % to 30 wt %, from 5 wt % to 25 wt %, or even from 5 wt % to 20 wt % of a plasticizer, in particular a polyisobutylene plasticizer, based on the weight of the pressure sensitive adhesive;
  f) optionally, from 1 wt % to 30 wt %, from 1 wt % to 25 wt %, from 2 wt % to 20 wt %, from 2 wt % to 15 wt %, or even from 2 wt % to 10 wt % of a filler material, preferably selected from the group of expandable microspheres and glass hollow glass microspheres, based on the weight of the pressure sensitive adhesive.

Item 33 is a curable precursor according to any of the preceding items, which is a precursor of a pressure sensitive adhesive foam.

Item 34 is a cured pressure sensitive adhesive obtainable by curing the curable precursor according to any of the preceding items, wherein the curing step is preferably performed by allowing acid to be released into the curable precursor of a pressure sensitive adhesive.

Item 35 is a cured pressure sensitive adhesive according to item 34, wherein the curing step is performed by subjecting the curable precursor of a pressure sensitive adhesive to a triggering energy sufficient to allow the acid generating agent to release acid into the curable precursor of a pressure sensitive adhesive, and wherein the triggering energy is preferably selected from the group of thermal energy or actinic radiation, more preferably UV radiation.

Item 36 is a composite assembly comprising a substrate and a curable precursor of a pressure sensitive adhesive according to any of items 1 to 33 applied onto at least part of the surface of the substrate, thereby forming a layer of a curable precursor of a pressure sensitive adhesive.

Item 37 is a composite assembly according to item 36, wherein the layer of a curable precursor of a pressure sensitive adhesive is cured, preferably by allowing acid to be released into the curable precursor of a pressure sensitive adhesive.

Item 38 is a composite assembly according to item 37, wherein the curing step is performed by subjecting the curable precursor of a pressure sensitive adhesive to a triggering energy sufficient to allow the acid generating agent to release acid into the curable precursor of a pressure sensitive adhesive, and wherein the triggering energy is preferably selected from the group of thermal energy or actinic radiation, more preferably UV radiation.

Item 39 is a composite assembly according to any of items 36 to 38, wherein the layer of a curable precursor of a pressure sensitive adhesive takes the form of a polymeric foam layer.

Item 40 is a composite assembly according to item 39, which further comprises a second pressure sensitive adhesive layer adjacent to the pressure sensitive adhesive foam layer, and preferably in-between the substrate and the pressure sensitive adhesive foam layer.

Item 41 is a composite assembly according to item 40, which further comprises a third pressure sensitive adhesive layer which is preferably adjacent to the pressure sensitive adhesive foam layer in the side of the pressure sensitive adhesive foam layer which is opposed to the side of the pressure sensitive adhesive foam layer adjacent to the second pressure sensitive adhesive layer.

Item 42 is a composite assembly according to any of items 36 to 41, which is an adhesive article, and wherein the substrate is preferably a releasable substrate, more preferably a releasable flexible backing layer.

Item 43 is a composite assembly according to any of items 36 to 41, wherein the substrate is a non-releasable substrate.

Item 44 is a composite assembly according to any of items 36 to 43, wherein the substrate is provided with an uneven surface.

Item 45 is a composite assembly according to item 44, wherein the uneven surface is provided with at least one structure selected from the group consisting of cavities, holes, apertures, orifices, pits, openings, gaps, troughs, edges, depressions, and any combinations thereof.

Item 46 is a composite assembly according to any of item 44 or 45, wherein the uneven surface is selected from the group of curved surfaces, bended surfaces, twisted surfaces, angled surfaces, arched surfaces, arced surfaces, and any combinations thereof.

Item 47 is a curable precursor of a pressure sensitive adhesive or a cured pressure sensitive adhesive or a composite assembly according to any of the preceding items, which has a Volatile Organic Compound (VOC) value of less than 5000 ppm, less than 3000 ppm, less than 2000 ppm, or even less than 1500 ppm, when measured by thermogravimetric analysis according to the weight loss test method described in the experimental section.

Item 48 is a method of applying a pressure sensitive adhesive to a substrate, comprising the steps of:
 a) providing a curable precursor of a pressure sensitive adhesive comprising:
  i. a (co)polymeric material comprising a rubber-based elastomeric material;
  ii. a polyfunctional aziridine curing agent; and
  iii. optionally, an acid generating agent;
 b) applying the curable precursor of a pressure sensitive adhesive to at least part of the surface of the substrate; and
 c) curing the curable precursor of a pressure sensitive adhesive by allowing acid to be released into it.

Item 49 is a method of applying a pressure sensitive adhesive to a substrate, comprising the steps of:
 a) providing a curable precursor of a pressure sensitive adhesive comprising:
  i. a (co)polymeric material comprising a rubber-based elastomeric material;
  ii. a polyfunctional aziridine curing agent; and
  iii. optionally, an acid generating agent;
 b) partially curing the curable precursor of a pressure sensitive adhesive by allowing acid to be released into it;
 c) applying the partially cured pressure sensitive adhesive to at least part of the surface of the substrate; and
 d) allowing the partially cured pressure sensitive adhesive to fully cure onto the substrate.

Item 50 is a method according to any of item 48 or 49, whereby the curing step is performed by subjecting the curable precursor of a pressure sensitive adhesive to a triggering energy sufficient to allow the acid generating agent to release acid into the curable precursor of a pressure sensitive adhesive, and wherein the triggering energy is preferably selected from the group of thermal energy or actinic radiation, more preferably UV radiation.

Item 51 is a method according to any of item 48 or 49, whereby the curing step is performed by contacting the curable precursor of a pressure sensitive adhesive with a source of acid, which is preferably selected from the group consisting of acid-containing compositions, acid-containing layers, acid-containing priming compositions, and any combinations or mixtures thereof.

Item 52 is a method of manufacturing a curable precursor of a pressure sensitive adhesive, comprising the step of providing a composition comprising:
 a) a (co)polymeric material comprising a rubber-based elastomeric material;
 b) a polyfunctional aziridine curing agent; and
 c) an acid generating agent.

Item 53 is a method of manufacturing a cured pressure sensitive adhesive, comprising the steps of:
 a) providing a curable precursor of a pressure sensitive adhesive comprising:
  i. a (co)polymeric material comprising a rubber-based elastomeric material;
  ii. a polyfunctional aziridine curing agent; and
  iii. optionally, an acid generating agent; and
 b) curing the curable precursor of a pressure sensitive adhesive by allowing acid to be released into it.

Item 54 is a method according to item 53, whereby the curing step is performed by subjecting the curable precursor of a pressure sensitive adhesive to a triggering energy sufficient to allow the acid generating agent to release acid into the curable precursor of a pressure sensitive adhesive, and wherein the triggering energy is preferably selected from the group of thermal energy or actinic radiation, more preferably UV radiation.

Item 55 is a method according to item 53, whereby the curing step is performed by contacting the curable precursor of a pressure sensitive adhesive with a source of acid, which is preferably selected from the group consisting of acid-containing compositions, acid-containing layers, acid-containing priming compositions, and any combinations or mixtures thereof.

Item 56 is a method according to any of items 52 to 55, which comprises the steps of:
 a) compounding a rubber-based elastomeric material; a polyfunctional aziridine curing agent; optionally, an acid generating agent; optionally, at least one hydrocarbon tackifier; optionally, a plasticizer, in particular a polyisobutylene plasticizer; and optionally, a filler material preferably selected from the group of expandable microspheres and glassbubbles; thereby forming a curable precursor of a pressure sensitive adhesive; and b) optionally, curing the curable precursor of a pressure sensitive adhesive by allowing acid to be released into it.

Item 57 is a method according to item 56, which is a solvent-free method.

Item 58 is a method according to any of item 56 or 57, which comprises a hotmelt processing step, preferably a continuous hotmelt mixing processing step, more preferably a hotmelt extrusion processing step, in particular a twin screw hotmelt extrusion processing step.

Item 59 is the use of a curable precursor of a pressure sensitive adhesive according to any of items 1 to 32 or the cured pressure sensitive adhesive according to any of item 33 or 34, for the bonding to an uneven or irregular substrate.

Item 60 is the use of a combination of a polyfunetional aziridine curing agent and an acid generating agent for preparing a cured pressure sensitive adhesive comprising a (co)polymeric material comprising a rubber-based elastomeric material.

Item 61 is the use of a curable precursor of a pressure sensitive adhesive according to any of items 1 to 33 or the cured pressure sensitive adhesive according to any of item 34 or 35, for industrial applications, in particular for interior applications, in particular for construction market applications, electronic applications, and automotive applications, in particular for taped seal on body applications for the automotive industry.

Examples

The invention is further illustrated by the following examples. These examples are merely for illustrative purposes only and are not meant to be limiting on the scope of the appended claims.

Test Methods Applied:

TGA Test Method

The TGA (Thermogravimetric Analysis) measurements are performed with a Q5000IR equipment from Texas Instruments. The samples are weighed in a platinum pan and placed with an auto sampler in the oven of the apparatus. The nitrogen flow through the oven is 25 mL/min, the nitrogen flow through the balance is 10 mL/min. The temperature is equilibrated at 30° C. and is held for 15 minutes. Then the temperature is increased to 90° C. with a ramp of 60° C./min. The 90° C. temperature is then held for 30 minutes. In a next step, the temperature is increased to 120° C. with a ramp of 60° C./min. The 120° C. temperature is held for 60 minutes. The weight losses during 30 minutes at 90° C. (VOC analysis) and during 60 minutes at 120° C. (FOG analysis) are recorded.

The test is then completed by increasing the temperature to 800° C. with a ramp of 10° C./min. Then, the temperature is equilibrated at 600° C., the oven is purged with air and the temperature is increased to 900° C. with a ramp of 10° C./min.

Oven Outgassing Test Method

A measure for the outgassing of a test sample made from the curable precursors of the invention is accomplished by cutting a piece of the test sample, the piece having a dimension of 4 cm×4 cm, and placing it into an aluminum cup. Prior to this step, the aluminum cup is already weighed out with a precision in the range of 0.1 mg. The weighed-in test sample is then placed into a forced air oven for 2 hours at 120° C. Once the sample is removed from the oven, it is allowed to cool at ambient temperature (23° C.+/−2° C.) for 30 minutes before weighing the filled aluminum cup again. The weight loss of the sample before and after oven drying is calculated and recorded in %.

Tensile/Elongation According ASTM D3759

The test is carried out at ambient room temperature (23° C.+/−2° C. and 50%+/−5% relative humidity) and the test sample is conditioned at this temperature for 24 h prior to testing. The test samples obtained from the curable precursors have the following dimensions-specimen length 50 mm comprising a width of 12.7 mm. Cutting of the test sample is done using a cutter holding two single-edges razor blades in parallel distance at the requested sample width. In a next step, the test samples are UV cured for 30 seconds at 40 mW/cm$^2$ and then wrapped on their outer opposing edges with a masking tape. Each test sample is then clamped into the upper and lower jaws of a Zwick tensile tester without imparting any additional tension to the test sample prior to testing. The cross head speed of the tensile tester is set to 300 mm/min and the sample testing is recorded as completed when the test sample ruptures. Three tests are made per test sample and the average value calculated.

Tensile Testing Using T-Block Geometry at 100 m/min

The test is carried out at ambient room temperature (23° C.+/−2° C. and 50%+/−5% relative humidity). First the aluminum T-Block surface is roughened with a ScotchBrite 4774 cleaning sponge and afterwards cleaned with pure isopropyl alcohol. The cleaned aluminum T-Block test surface is then further pre-treated with a commercially available 3M Primer P94 to avoid pop-off aluminum failures during testing. The liner is first removed from one side of the test specimen. A first aluminum T-Block is then brought onto the exposed adhesive surface of the test specimen and the overstanding adhesive is cut at the edges of the aluminum T-Block. The liner on the other side of the test specimen is thereafter removed and a second, in the same way cleaned and primed aluminum T-Block is brought then onto the open adhesive surface. A force of 300 N+/−5N for 15 seconds is then applied onto the prepared test sample. After a dwell time of at least 24 hours at ambient room temperature (23° C.+/−2° C. and 55%+/−5% relative humidity) the test sample is tested in a Zwick tensile tester by performing a tensile test at 100 mm/min. The complete stress-strain curves as well as the adhesion energy and maximal forces are then collected.

Tensile Testing in OLS (Overlap Shear) Geometry at 100 m/min (In Accordance With ASTM D897)

Overlap shear strength is determined according to ASTM D897 using a tensile tester of the type ZWICK/ROELL Z020 (available from Zwick GmbH & Co. KG, Ulm, Germany) at a crosshead speed of 100 mm/min. For the test assembly preparation, two aluminum test panels (as later described under point b.), are joined in a overlap connection of 10 mm width and 25 mm length using pressure sensitive adhesive assemblies of the current disclosure and by pressing these overlap shear test assemblies for 15 seconds with 300 N (+/−5 N). The test assemblies are then conditioned prior to testing for 24 hours at 23° C. (+/−2° C.) and 50% humidity (+/−5%).

Test Panels/Substrates Used for Testing:

a.) Aluminum T-Blocks: AlMg3 (Int. 5754) T-Profile, dimension of 25 mm×25 mm and a height of 25 mm with 10 mm wide drilled hole; material thickness 3 mm. The aluminium T-Blocks are cleaned as follows. First, the aluminum T-Block surface is roughened with a ScotchBrite 4774 sponge (commercially available by 3M Deutschland GmbH, Germany) and then cleaned with pure isopropyl alcohol. The cleaned aluminum T-Block test surface is further pretreated with a commercially available 3M Primer P94.

b.) Aluminum test panels in accordance with ASTM B211 having a dimension of 50 mm×25 mm×1 mm. Prior to the preparation of an OLS test assembly, the aluminum panels are roughened using ScotchBrite 4774 (commercially available by 3M) and afterwards wiped once with isopropyl alcohol. Drying is done using a paper tissue. The cleaned aluminum test panel surface is then further pretreated with a commercially available 3M Primer P94.

Raw Materials:

In the examples, the following raw materials are used:

Kraton D1340: is a polymodal asymmetric SIS star block copolymer which is obtained from Kraton polymer.

Irgacure PAG 290: Tetrakis(2,3,4,5,6,-pentafluorophenyl) boranide; tris(4-(4-acetylphenyl)sulfonylphenyl) sulfonium, photo acid generator, commercially available from BASF GmbH, Ludwigshafen, Germany.

Escorez 5615: aliphatic/aromatic hydrocarbon resin, commercially available from ExxonMobil.

Oppanol B12N: Polyisobutylene of $M_w$=51000 g/mol, commercially available from BASF GmbH, Ludwigshafen, Germany.

Aziridine curing agent 1: CX-100 Trimethylolpropane tris(2-methyl-1-aziridinepropionate), trifunctional aziridine curing agent, commercially available from DSM Neo Resins BV, Waalwijk, Netherlands.

Aziridine curing agent 2: Ethoxylated (4 EO) Bisphenol A Bis[3-(2-Methyaziridino)-propanoate], synthesized as later described.

Aziridine curing agent 3: Aziridinoalkylcarbamato-polyether, synthesized as later described.

3M Glass bubbles (K37): are hollow glass bubbles with a diameter of 85 μm, available from 3M, Germany.

Aerosil R-972: are hydrophobic fumed silica particles, available from Evonik, Germany.

Calcium Oxide: stabilizer, commercially available from Sigma Aldrich, Seelze, Germany.

Irganox 1010: Heat stabilizer, commercially available from BASF GmbH, Ludwigshafen, Germany.

Primer 94 (P94): adhesion promoter for pressure sensitive adhesives, commercially available from 3M Deutschland GmbH, Germany.

ACX 7065: Black Acrylic foam tape 1200 μm, commercially available from TESA SE, Germany.

Preparation of Aziridine Curing Agent 2:

In a round bottom flask ethoxylated (4EO) bisphenol A diacrylate (500 g=1927 meq. C=C, e.g. Sartomer SR601E) are placed. 6.25 g equaling 8.6 ml triethyl amine are then added and the mixture is stirred. To the clear solution 2-methyl aziridine (137.5 g=2408.4 mmol) are added dropwise at ambient room temperature (23° C. (+/−2° C.) and 50% humidity (+/−5%)) while continuous stirring. The temperature initially remains at 23 to 24° C. but rises to about 41° C. after about 20% of the addition of 2-methyl aziridine. In order to keep the temperature of reaction mixture at 35 to 40° C., an ice bath is used. The entire dosing time is approximately 4 hours. After that the reaction mixture is stirred 48 hours at ambient room temperature. After that time there are no more traces of acrylate double bonds more visible in the $^1$H NMR spectrum of the reaction mixture. Excess 2-methyl aziridine together with triethyl amine are then removed by vacuum distillation at 40° C. and 0.1 mbar. A clear colorless oil in a yield of 99% (602 g) is obtained with a kinematic viscosity of 1.5 Pa*s at 23° C. and 50-100 1/s.

Preparation of Aziridine Curing Agent 3—Aziridinoalkyl-carbamato-Polyether:

500 parts by weight of an aziridino polyether, prepared according to the teaching of DE 1 745 810, with a numerically average molar mass of 6100 g/mol and an incorporation ratio of ethylene oxide to tetrahydrofuran units of 1:3.6, containing 8.2 parts by weight of cyclic oligomeric polyethers, which has been washed with water 5 times after the functionalization with aziridino groups, is covered with 300 parts by weight hexane without intermediate drying and stirred at 20° C. The upper phase (hexane phase) is removed and the residue covered afresh with 300 parts by weight hexane. This process is repeated 7 times and then the hexane phase and the aqueous phase are separated off. After workup of the hexane phase, 450 parts by weight of a bis-aziridino polyether containing 0.25 wt % of cyclic oligomeric polyethers are obtained.

Curable Precursors Compounding and Preparation of the Test Samples:

Preparation of the Curable Precursors

Curable precursors compounding is made in a hot melt process using a Brabender Plastograph 350 EHT kneader (commercially available by Brabender GmbH, Duisburg, Germany) having a kneading volume of 370 cm$^3$. In a first step, the selected rubber-based elastomeric material, the hydrocarbon tackifier resin(s) and the plasticizer(s) are added carefully under a constant kneading rate of 30 rpm at 140° C. until a homogeneous mass is obtained. In a second step, the antioxidant Irganox 1010 is added to reduce material degradation during the hot melt processing. The respective aziridine curing agent is then pre-mixed with half of the K37 glass bubbles and then added to the kneader. In a final step, the Irgacure 290 and the remaining K37 glass bubbles are added. The curable precursor compounds are then mixed for approximately 5 minutes until a homogeneous blend is achieved. After the hot melt processing of the curable precursor compounds is completed, the mixtures are pressed to obtain a sample thickness of 1200 mm between two siliconized liners using a hydraulic heat press (Type No. TP400, commercially available by Fortune, Holland). Hereby the mixtures are first pressed at a pneumatic pressure of 10 kN at 130° C. followed by an additional 5 minutes at 130° C. using a higher pneumatic pressure of 40 kN.

UV Triggering

Curing of the curable precursors of pressure sensitive adhesives is done using a UV-A lamp, type UVA lamp 250 commercially available from Dr. Hönle in Planegg, Germany. The triggering time is 30 seconds at 40 mW/cm$^2$. After light exposure, the samples are stored for between 24 h to 72 h at ambient room temperature (23° C.+/−2° C., 50% relative humidity+/−5%) until network building is assumed to be completed.

Formulations of the Curable Precursors Used for Making the Pressure Sensitive Adhesives The formulations of the curable precursors used for making the cured pressure sensitive adhesives (C$_1$ and CP1-CP10) are listed in Table 1. Table 1 also contains comparative example 1, later referred to as C1. Example C1 is a curable precursor without an acid generating agent and without a polyfunctional aziridine curing agent.

TABLE 1

| (CP) | K-D 1340 (parts) | E5615 (parts) | B12N (parts) | I-1010 (parts) | I-290 (parts) | K37 (parts) | Azir-1 (parts) | Azir-2 (parts) | Azir-3 (parts) | Ca Oxide (parts) | R972 (parts) |
|---|---|---|---|---|---|---|---|---|---|---|---|
| C1   | 45 | 40 | 15 | 1.35 |     | 12 |    |    |    |      |   |
| CP1  | 45 | 40 | 15 | 1.35 |     | 12 |    | 10 |    |      |   |
| CP2  | 45 | 40 | 15 | 1.35 | 2   | 12 |    | 10 |    |      |   |
| CP3  | 45 | 40 | 15 | 1.35 | 2   | 12 | 10 |    |    |      |   |
| CP4  | 45 | 40 | 15 | 1.35 | 2   | 12 | 5  | 5  |    |      |   |
| CP5  | 45 | 40 | 15 | 1.35 | 2   | 12 | 2  | 8  |    |      |   |
| CP6  | 45 | 40 | 15 | 1.35 | 1   | 12 | 10 |    |    |      |   |
| CP7  | 45 | 40 | 15 | 1.35 | 1   | 12 | 10 |    |    | 0.06 |   |
| CP8  | 45 | 40 | 15 | 1.35 | 1   | 12 |    |    | 10 |      |   |
| CP9  | 45 | 40 | 15 | 1.35 | 1.2 | 12 | 5  |    | 5  |      |   |
| CP10 | 45 | 40 | 15 | 1.35 | 1.2 | 12 | 10 |    |    |      | 4 |

For the tensile testing in overlap shear geometry as well as the tensile testing using T-block geometry of the UV cured curable precursor compounds CP7 through CP10, adhesive skins—made out of a solvent solution—are needed to be laminated to both sides of the cured curable precursor compounds. The composition of the adhesive skins is listed in Table 2 below.

TABLE 2

| Skin adhesive | Kraton D 1340 (g) | Escorez 5615 (g) | Opanol B12N (g) | Irganox 1010 (g) | Toluene (g) |
|---|---|---|---|---|---|
| S1 | 45.5 | 44 | 7.4 | 1.35 | 150 |

Adhesive Skin Preparation From Solvent and Skin Lamination to Cured Adhesives Prepared From the Respective Curable Precursors of Pressure Sensitive Adhesives The raw materials indicated in Table 2 (in total 98.25 grams) are weighed into a glass jar and 150 g of toluene are then added. The jar is covered with a metal lid and placed on rotating rolls. The mixture is then rolled for 2 days until all the components are dissolved. The solutions are coated on a siliconized paper liner with a knife coater. The wet film is 300 μm thick. The toluene is allowed to evaporate from the film for 20 minutes at room temperature (23° C.+/−2° C.) before the PSA coating is annealed for 3 min at 110° C. Following this process, an adhesive skin adhesive with a coating weight of 100 g/sqm is obtained. The skin adhesives are then laminated onto the cured adhesive strips of the curable precursors with the help of a hand roller.

Test Results:

Tensile/Elongation

The tensile/elongation test results of all curable precursors CP1-CP10, as well as comparative example C1 are listed in Table 3 below.

TABLE 3

| Curable precursor | Before UVA F1 in N/cm² at 200 mm | After UVA exposure (30 sec & 24 h dwell time) F1 in N/cm² at 200 mm | Before UVA F2 in N/cm² at 400 mm | After UVA exposure (30 sec & 24 h dwell time) F2 in N/cm² at 400 mm |
|---|---|---|---|---|
| C1   | 46.2 | 20.7  | 74.2 | 51.1  |
| CP1  | 21.0 | 18.8  | 56.1 | 46.3  |
| CP2  | 31.8 | 82.4  | 74.0 | 109.2 |
| CP3  | 21.2 | 50.5  | 58.6 | 84.6  |
| CP4  | 21.1 | 55.2  | 58.6 | 86.2  |
| CP5  | 17.5 | 83.5  | 50.7 | 108.4 |
| CP6  | 16.1 | 51.2  | 45.2 | 87.5  |
| CP7  | 14.6 | 29.3  | 35.4 | 54.0  |
| CP8  | 26.7 | 44.5  | 43.7 | 59.4  |
| CP9  | 18.7 | 48.6  | 40.1 | 67.9  |
| CP10 | 26.3 | 59.7  | 51.3 | 85.2  |

In all curable precursor samples CP2 through CP10, the post-curing effect after UV triggering of the samples can be clearly observed. As expected, comparative example C1 does not show this effect. Same statement applies for curable precursor sample CP1 which does not contain a photo acid generator. The decrease of the tensile/elongation values of this sample is a result of the aziridine contained in the sample making the sample softer.

OLS and T-Block Tensile Tesults

The results of the OLS tensile testing for the pressure sensitive adhesives made from curable precursors CP7 to CP10 having laminated adhesive skins S1 on both of the opposing sides of CP7 to CP10 are provided in Table 4 below. In this table, the resulting forces at 2 mm, 4 mm and maximum elongation for uncured and cured pressure sensitive adhesives are listed.

TABLE 4

| Curable precursor | F (2 mm)/N (uncured) | F (2 mm)/N (cured 30 sec UVA + 24 h dwell time @RT) | F (4 mm)/N (uncured) | F (4 mm)/N (cured 30 sec UVA + 24 h dwell time @RT) | F (max)/N (uncured) | F (max)/N (cured 30 sec UVA + 24 h dwell time @RT) |
|---|---|---|---|---|---|---|
| CP7 | 31.8 | 39.2 | 41.8 | 53.7 | 135.9 | 195.0 |
| CP8 | 30.9 | 39.5 | 39.4 | 55.1 | 74.7 | 104.7 |
| CP9 | 28.9 | 39.4 | 43.7 | 52.3 | 200.5 | 248.6 |
| CP10 | 36.6 | 55.4 | 56.3 | 69.6 | 194.8 | 213.7 |

For the pressure sensitive adhesives made from curable precursors CP7 to CP10 comprising on both sides adhesive skins S1 the post-curing effect of the pressure-sensitive adhesives can be clearly seen, irrespective of the aziridine curing agent/aziridine curing agent mixture selected.

The results of the T-block tensile testing for the pressure sensitive adhesives made from curable precursors CP7 to CP10 having laminated adhesive skins S1 on both of the opposing sides of CP7 to CP10 are provided in Table 5 below. In this table, the resulting forces at 2 mm, 4 mm and maximum elongation of cured and uncured pressure sensitive adhesives are listed.

TABLE 5

| Curable precursor | F (2 mm)/N (uncured) | F (2 mm)/N (cured 30 sec UVA + 24 h dwell time @RT) | F (4 mm)/N (uncured) | F (4 mm)/N (cured 30 sec UVA + 24 h dwell time @RT) | F (max)/N (uncured) | F (max)/N (cured 30 sec UVA + 24 h dwell time @RT) |
|---|---|---|---|---|---|---|
| CP7 | 127.0 | 137.9 | 124.7 | 145.3 | 180.5 | 208.7 |
| CP8 | 137.5 | 190.7 | 114.3 | 197.5 | 143.2 | 198.3 |
| CP9 | 115.5 | 158.8 | 141.0 | 176.4 | 188.6 | 265.4 |
| CP10 | 141.0 | 176.4 | 133.3 | 185.0 | 142.1 | 211.5 |

Similar to the results in Table 4, the results of the mechanical tensile testing in T-block geometry also clearly show the post-curing effects of the pressure sensitive adhesives.

Oven Outgassing Results

The oven outgassing tests enable on a laboratory scale a quick evaluation, if a selected curable precursor will contribute towards obtaining a low VOC pressure-sensitive adhesive. Results of this test are shown in Table 6 below and recorded as weight loss in (g) with a resolution of 0.1 g. The weight loss is then calculated into ppm with respect to the initial weight of the sample.

TABLE 6

Oven outgassing values of selected curable precursors.

| Curable precursor | Before UV triggering, after 2 h at 120° C. (ppm) | After UV triggering, after 2 h at 120° C. (ppm) |
|---|---|---|
| C1 | 711 +/− 154 | 491 +/− 454 |
| CP2 | 1324 +/− 681 | 1593 +/− 723 |
| CP3 | 2446 +/− 277 | 2107 +/− 26 |

TGA Test Results

Thermogravimetric analysis (TGA) of several curable precursors and comparative example C1 are performed. Results are found in Table 7 below. The weight loss after 30 min at 90° C. is referred to as the VOC value, whereas the weight loss after 60 min at 120° C. represents the FOG value of the respective test sample.

TABLE 7

TGA results of selected curable precursors, as well as comparative example C1.

| Curable Precursor | Weight loss 30 min 90° C. (in ppm) | Weight loss 60 min 120° C. (in ppm) |
|---|---|---|
| C1 | 1060.2 | 923.9 |
| CP2 | 960.9 | 681.0 |

TABLE 7-continued

TGA results of selected curable precursors, as well as comparative example C1.

| Curable Precursor | Weight loss 30 min 90° C. (in ppm) | Weight loss 60 min 120° C. (in ppm) |
|---|---|---|
| CP7 | 1261.2 | 973.3 |
| CP8 | 959.5 | 1092.1 |
| CP9 | 488.1 | 366.4 |
| ACX 7065 | 1984 | 5653 |

Curable precursor 9 is significantly lower than all other samples provided in Table 7 concerning its VOC and FOG values, indicating that a mixture of aziridine curing agent 1 with aziridine curing agent 3 provides advantageous results versus other samples either comprising no aziridine curing agent at all ($C_1$) or just solely one of the selected aziridine curing agents. For comparison reasons, thermogravimetric analysis is also performed on acrylic foam tape ACX 7065 commercially available from Tesa, Germany. As shown in Table 7, the TGA values of the acrylic tape are higher than any of the rubber-based curable precursors.

The invention claimed is:

1. A curable precursor of a pressure sensitive adhesive comprising:
   a) a (co)polymeric material comprising a rubber-based elastomeric material;
   b) a polyfunctional aziridine curing agent; and
   c) an acid generating agent.

2. A curable precursor according to claim 1, wherein the rubber-based elastomeric material is selected from the group consisting of natural rubbers, synthetic rubbers, thermoplastic elastomeric materials, non-thermoplastic elastomeric materials, thermoplastic hydrocarbon elastomeric materials, non-thermoplastic hydrocarbon elastomeric materials, and any combinations or mixtures thereof.

3. A curable precursor according to claim 1, wherein the rubber-based elastomeric material is selected from the group consisting of halogenated butyl rubbers; halogenated isobutylene-isoprene copolymers; bromo-isobutylene-isoprene copolymers; chloro-isobutylene-isoprene copolymers; block copolymers; olefinic block copolymers; butyl rubbers; synthetic polyisoprene; ethylene-octylene rubbers; ethylene-propylene rubbers; ethylene-propylene random copolymers; ethylene-propylene-diene monomer rubbers; polyisobutylenes; poly(alpha-olefin); ethylene-alpha-olefin copolymers; ethylene-alpha-olefin block copolymers; styrenic block copolymers; styrene-isoprene-styrene block copolymers; styrene-butadiene-styrene block copolymers; styrene-ethylene/butadiene-styrene block copolymers; styrene-ethylene/propylene-styrene block copolymers; styrene-butadiene random copolymers; olefinic polymers and copolymers; ethylene-propylene random copolymers; ethylene-propylene-diene terpolymers, and any combinations or mixtures thereof.

4. A curable precursor according to claim 1, wherein the polyfunctional aziridine curing agent comprises two or three aziridine functional groups.

5. A curable precursor according to claim 1, wherein the polyfunctional aziridine curing agent has the following formula:

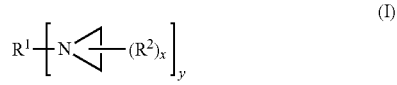

wherein
$R^1$ is a (hetero)hydrocarbyl group;
$R^2$ is an H or $C_1$-$C_{12}$ alkyl group, $C_1$-$C_8$ alkyl group, $C_1$-$C_6$ alkyl group, $C_1$-$C_4$ alkyl group, $C_1$-$C_2$ alkyl group, $C_6$-$C_{12}$ aromatic group, $C_6$-$C_{10}$ aromatic group, or even $C_6$-$C_7$ aromatic group; $C_2$-$C_{12}$ alkenyl group; $C_2$-$C_{12}$ alkinyl group; $C_7$-$C_{15}$ alkylaryl group; $C_7$-$C_{15}$ arylalkyl group or $C_3$-$C_{12}$ cycloalkyl group, and wherein hydrogen atoms can be replaced by $C_1$ or F and/or wherein up to about 5 carbon atoms may be replaced by atoms or group of atoms selected from O, CO, N or S;
x is 0, 1 or 2, and
y is at least 1.

6. A curable precursor according to claim 1, wherein the polyfunctional aziridine curing agent has the following formula:

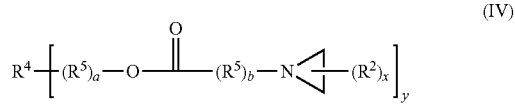

wherein
$R^4$ is a (hetero)hydrocarbyl group having a valency of y;
$R^5$ and $R^6$ are independently (hetero)hydrocarbyl groups;
$R^2$ is an H or $C_1$-$C_{12}$ alkyl group, $C_1$-$C_8$ alkyl group, $C_1$-$C_6$ alkyl group, $C_1$-$C_4$ alkyl group, $C_1$-$C_2$ alkyl group, $C_6$-$C_{12}$ aromatic group, $C_6$-$C_{10}$ aromatic group, or even $C_6$-$C_7$ aromatic group;
y is at least 1;
x is 0, 1 or 2; and
each of a and b are independently 0 to 6, 0 to 4, or even 0 to 2.

7. A curable precursor according to claim 1, wherein the acid generating agent is selected from the group consisting of thermal acid generating agents, photo acid generating agents, and any combinations or mixtures thereof.

8. A curable precursor according to claim 1, wherein the acid generating agent is a thermal acid generating agent selected from the group consisting of quarternary blocked superacids, amine blocked superacids, and any combinations or mixtures thereof.

9. A curable precursor according to claim 1, wherein the acid generating agent is a photo acid generating agent selected from the group consisting of ionic salts of organometallic complexes and onium salts, and any combinations or mixtures thereof.

10. A curable precursor according to claim 1, wherein the pressure sensitive adhesive further comprises at least one hydrocarbon tackifier, wherein the hydrocarbon tackifier(s) have a Volatile Organic Compound (VOC) value of less than 1000 ppm, when measured by thermogravimetric analysis according to the weight loss test methods described in the experimental section.

11. A curable precursor according to claim 1, wherein the pressure sensitive adhesive further comprises a plasticizer, which is selected from the group consisting of polyisobutylenes, and wherein the plasticizer(s) have a Volatile Organic Compound (VOC) value of less than 1000 ppm, when measured by thermogravimetric analysis according to the weight loss test methods described in the experimental section.

12. A curable precursor according to claim 1, which comprises:
   a) from 20 wt % to 80 wt % of the (co)polymeric material comprising a rubber-based elastomeric material, based on the weight of the pressure sensitive adhesive;
   b) from 0.1 wt % to 30 wt % of a the polyfunctional aziridine curing agent, based on the weight of the pressure sensitive adhesive;
   c) from 0.01 wt % to 10 wt % of the acid generating agent, based on the weight of the pressure sensitive adhesive; and d) optionally, from 5 wt % to 60 wt % of hydrocarbon tackifier(s), based on the weight of the pressure sensitive adhesive;
e) optionally, from 1 wt % to 40 wt % of a plasticizer, based on the weight of the pressure sensitive adhesive;
f) optionally, from 1 wt % to 30 wt % of a filler material selected from the group of expandable microspheres and glass hollow glass microspheres, based on the weight of the pressure sensitive adhesive.

13. A cured pressure sensitive adhesive obtainable by curing the curable precursor according to claim 1, wherein the curing step is performed by allowing acid to be released into the curable precursor of a pressure sensitive adhesive.

14. A cured pressure sensitive adhesive according to claim 13, wherein the curing step is performed by subjecting the curable precursor of a pressure sensitive adhesive to a triggering energy sufficient to allow the acid generating agent to release acid into the curable precursor of a pressure sensitive adhesive, and wherein the triggering energy is selected from the group of thermal energy or actinic radiation.

15. A cured pressure sensitive adhesive according to claim 14, which has a Volatile Organic Compound (VOC) value of less than 5000 ppm, less than 3000 ppm, less than 2000 ppm, or even less than 1500 ppm, when measured by thermogravimetric analysis according to the weight loss test method described in the experimental section.

16. A method of applying a pressure sensitive adhesive to a substrate, comprising the steps of:

a) providing a curable precursor of a pressure sensitive adhesive comprising:
   i. a (co)polymeric material comprising a rubber-based elastomeric material;
   ii. a polyfunctional aziridine curing agent; and
   iii. optionally, an acid generating agent;
b) applying the curable precursor of a pressure sensitive adhesive to at least part of the surface of the substrate; and
c) curing the curable precursor of a pressure sensitive adhesive by allowing acid to be released into it.

17. A method according to claim 16, wherein the curable precursor of the pressure sensitive adhesive contains the acid generating agent and whereby the curing step is performed by subjecting the curable precursor of a pressure sensitive adhesive to a triggering energy sufficient to allow the acid generating agent to release acid into the curable precursor of a pressure sensitive adhesive, and wherein the triggering energy is selected from the group of thermal energy or actinic radiation.

18. A method according to claim 16, whereby the curing step is performed by contacting the curable precursor of a pressure sensitive adhesive with a source of acid, which is selected from the group consisting of acid-containing compositions, acid-containing layers, acid-containing priming compositions, and any combinations or mixtures thereof.

* * * * *